United States Patent
Dubey et al.

(10) Patent No.: US 8,038,790 B1
(45) Date of Patent: Oct. 18, 2011

(54) HIGH PERFORMANCE NON-COMBUSTIBLE GYPSUM-CEMENT COMPOSITIONS WITH ENHANCED WATER DURABILITY AND THERMAL STABILITY FOR REINFORCED CEMENTITIOUS LIGHTWEIGHT STRUCTURAL CEMENT PANELS

(75) Inventors: Ashish Dubey, Grayslake, IL (US); Cesar Chan, Libertyville, IL (US)

(73) Assignee: United States Gypsum Company, Chicago, IL (US)

( * ) Notice: Subject to any disclaimer, the term of this patent is extended or adjusted under 35 U.S.C. 154(b) by 0 days.

(21) Appl. No.: 12/977,801

(22) Filed: Dec. 23, 2010

(51) Int. Cl.
*C04B 14/18* (2006.01)
*C04B 11/30* (2006.01)

(52) U.S. Cl. ........ 106/675; 106/698; 106/709; 106/711; 428/703; 428/704

(58) Field of Classification Search .................. 106/675, 106/698, 709, 711; 428/703, 704
See application file for complete search history.

(56) References Cited

U.S. PATENT DOCUMENTS

| | | | |
|---|---|---|---|
| 3,269,071 A | 8/1966 | Johnson | |
| 3,284,980 A | 11/1966 | Dinkel | |
| 3,502,490 A | 3/1970 | Ware | |
| 3,869,295 A | 3/1975 | Bowles et al. | |
| 3,908,062 A | 9/1975 | Roberts | |
| 4,278,468 A | 7/1981 | Selbe et al. | |
| 4,304,704 A * | 12/1981 | Billings | 523/212 |
| 4,369,554 A | 1/1983 | Curinier et al. | |
| 4,454,267 A | 6/1984 | Williams | |
| 4,686,253 A | 8/1987 | Struss et al. | |
| 4,889,747 A | 12/1989 | Wilson | |
| 5,041,333 A | 8/1991 | Conroy | |
| 5,112,405 A | 5/1992 | Sanchez | |
| 5,207,830 A | 5/1993 | Cowan et al. | |
| 5,601,919 A * | 2/1997 | Symons | 428/375 |
| 5,718,759 A | 2/1998 | Stav et al. | |
| 6,221,521 B1 | 4/2001 | Lynn et al. | |
| 6,241,015 B1 | 6/2001 | Pringle et al. | |
| 6,241,815 B1 * | 6/2001 | Bonen | 106/735 |
| 6,319,312 B1 * | 11/2001 | Luongo | 106/675 |
| 6,620,487 B1 * | 9/2003 | Tonyan et al. | 428/192 |
| 6,902,614 B2 | 6/2005 | Ratomski et al. | |
| 7,381,261 B1 | 6/2008 | Nelson | |
| 7,445,738 B2 * | 11/2008 | Dubey et al. | 264/128 |
| 7,875,358 B2 * | 1/2011 | Englert et al. | 428/451 |
| 2008/0057318 A1 | 3/2008 | Adzima et al. | |
| 2009/0011207 A1 * | 1/2009 | Dubey | 428/219 |
| 2009/0011251 A1 * | 1/2009 | Englert et al. | 428/446 |
| 2009/0038248 A1 * | 2/2009 | Koslowski | 52/344 |
| 2009/0085253 A1 | 4/2009 | Kruss | |
| 2009/0162602 A1 | 6/2009 | Cottier et al. | |
| 2010/0197182 A1 * | 8/2010 | Barzilai | 442/1 |

FOREIGN PATENT DOCUMENTS

WO 9304007 3/1993

OTHER PUBLICATIONS

ASTM C1704/C1704M-09a, Standard Test method for Sampling and Testing Structural Cementitious Panels, ASTM International (2009).
ASTM C1705/C1705M-09, Standard Specification for Structural Cementitious Panels, ASTM International (2009).
ASTM C1285-08, Standard Test Methods for Sampling and Testing Non-Asbestos Fiber-Cement Flat Sheet, Roofing and Siding Shingles, and Clapboards, ASTM International (2008).
Acceptance Criteria for Structural Cementitious Floor and Roof Sheathing Panels, AC318, ICC Evaluation Service, Jul. 1, 2009.
Silbrico Corporation, SIL-CELL, URL <http://www.silbrico.com/>, retrieved from the internet Jun. 25, 2010.

* cited by examiner

*Primary Examiner* — Anthony Green
(74) *Attorney, Agent, or Firm* — Novak Druce + Quigg, LLP; Philip T. Petti; David F. Janci

(57) ABSTRACT

Structural cement panel for resisting transverse and shear loads equal to transverse and shear loads provided by plywood and oriented strain board, when fastened to framing for use in shear walls, flooring and roofing systems. The panels provide reduced thermal transmission compared to other structural cement panels. The panels employ one or more layers of a continuous phase resulting from curing an aqueous mixture of calcium sulfate alpha hemihydrate, hydraulic cement, coated expanded perlite particles filler, optional additional fillers, active pozzolan and lime. The coated perlite has a particle size of 1-500 microns, a median diameter of 20-150 microns, and an effective particle density (specific gravity) of less than 0.50 g/cc. The panels are reinforced with fibers, for example alkali-resistant glass fibers. The preferred panel contains no intentionally added entrained air. A method of improving fire resistance in a building is also disclosed.

20 Claims, 25 Drawing Sheets

HIGH PERFORMANCE NON-COMBUSTIBLE GYPSUM-CEMENT COMPOSITIONS WITH ENHANCED WATER DURABILITY AND THERMAL STABILITY FOR REINFORCED CEMENTITIOUS LIGHTWEIGHT STRUCTURAL CEMENT PANELS

FIELD OF THE INVENTION

This invention relates generally to a high performance non-combustible gypsum-cement compositions for use in making lightweight structural cementitious panels, termed here as SCP panels. The panels are typically used in residential and commercial shear walls, flooring and roofing systems. The panels provide a non-combustible, fire resistant shear resistant diaphragm which is water durable and thermal resistant and has shear and axial load carrying capacity. The system, when mounted on framing, particularly steel framing, provides non-combustibility, water durability, fire resistance, thermal stability, mold resistance, and high specific strength and stiffness.

BACKGROUND OF THE INVENTION

This invention relates generally to panels applied to framing in residential and other types of light construction. More particularly, the invention relates to panels able to resist lateral forces imposed by high wind and earthquake loads in regions where they are required by building codes. Such panels, commonly known as shear walls or diaphragms, must demonstrate shear resistance as shown in recognized tests, such as ASTM E72-05 (effective 2005).

The sheathing panels are measured to determine the load which the panel can resist within the allowed deflection without failure. The shear rating is generally based on testing of three identical 8×8 ft (2.44×2.44 m) assemblies, i.e., panels fastened to framing. One edge is fixed in place while a lateral force is applied to a free end of the assembly until the load is no longer carried and the assembly fails.

The measured shear strength will vary, depending upon the thickness of the panel and the size and spacing of the nails used in the assembly. For example, a typical assembly, e.g., a nominal ½ inch (12.7 mm) thick plywood fastened with 8d nails (see the nail description below) to nominal 2×4 inch (50.8×101.6 mm) wood studs spaced 16 inches (406.4 mm) apart (on centers), the nails being spaced 6 inches (152.4 mm) apart on the perimeter and 12 inches (304.8 mm) apart within the perimeter, would be expected to show a shear strength of 720 lbs/ft (1072 kg/m) before failure occurs. (Note the measured strength will vary as the nail size and spacing is changed, as the ASTM E72 test provides.) This ultimate strength will be reduced by a safety factor, e.g., a factor of three, to set the design shear strength for the panel.

U.S. Pat. No. 6,620,487 to Tonyan et al., incorporated herein by reference in its entirety, discloses a reinforced, lightweight, dimensionally stable structural cement panel (SCP) capable of resisting shear loads when fastened to framing equal to or exceeding shear loads provided by plywood or oriented strand board panels. The panels employ a core of a continuous phase resulting from the curing of an aqueous mixture of calcium sulfate alpha hemihydrate, hydraulic cement, an active pozzolan and lime, the continuous phase being reinforced with alkali-resistant glass fibers and containing ceramic microspheres, or a blend of ceramic and polymer microspheres, or being formed from an aqueous mixture having a weight ratio of water-to-reactive powder of 0.6/1 to 0.7/1 or a combination thereof. At least one outer surface of the panels may include a cured continuous phase reinforced with glass fibers and containing sufficient polymer spheres to improve nailability or made with a water-to-reactive powders ratio to provide an effect similar to polymer spheres, or a combination thereof.

U.S. Pat. No. 6,241,815 to Bonen, incorporated herein by reference in its entirety, also discloses formulations useful for SCP panels.

U.S. Pat. No. 7,445,738 to Dubey, incorporated herein by reference, discloses a multi-layer process for producing structural cementitious panels (SCP's or SCP panels), and SCP's produced by such a process. After one of an initial deposition of loosely distributed, chopped fibers or a layer of slurry upon a moving web, fibers are deposited upon the slurry layer. An embedment device mixes the recently deposited fibers into the slurry, after which additional layers of slurry, and then chopped fibers are added, followed by more embedment. The process is repeated for each layer of the board, as desired.

US Patent Application Publication No. 2009/0011207 A1 to Dubey, incorporated herein by reference, discloses a fast setting lightweight cementitious composition for construction of panels or boards. The cementitious composition includes 35-60 wt. % cementitious reactive powder (also termed Portland cement-based binder), 2-10 wt. % expanded and chemically coated perlite filler, 20-40 wt. % water, entrained air, for example 10-50 vol. %, on a wet basis, entrained air, and optional additives such as water reducing agents, chemical set-accelerators, and chemical set-retarders. The lightweight cementitious compositions may also optionally contain 0-25 wt. % secondary fillers, for example 10-25 wt. % secondary fillers. Typical filler include one or more of expanded clay, shale aggregate, and pumice. The cementitious reactive powder used is typically composed of either pure Portland cement or a mixture of Portland cement and a suitable pozzolanic material such as fly ash or blast furnace slag. The cementitious reactive powder may also optionally contain one or more of gypsum (land plaster) and high alumina cement (HAC) added in small dosages to influence setting and hydration characteristics of the binder.

U.S. Pat. No. 4,304,704 to Billings discloses thermal insulating material containing silicone treated perlite and an admixture with gypsum and cement.

U.S. Pat. No. 5,601,919 to Symons discloses a building component having a core formed from one or more sheets of natural fiber impregnated with a liquid composition including a thermoplastic resin and a catalyst for setting the resin and an encapsulating layer encapsulating the core which can contains a hydraulic binder and water wherein the binder is selected from Portland cement or calcium sulphate hemihydrate at 15-65 parts by weight and a filler which can be expanded vermiculite or perlite. The expanded perlite is of 0.05 mm to 3 mm particle size which is treated with silicone to make it hydrophobic.

There remains a need for improved panels which can meet the shear rating required in certain locations and which exceed the capability of the currently-used wood-based panels as well as current gypsum-cement based structural cement panels by providing a non-combustible panel with the same shear strength at lower panel weight which also has improved water durability and thermal resistance.

SUMMARY OF THE INVENTION

The panels of the invention may generally be described as made of gypsum-cement compositions reinforced with glass fibers and, with the addition of coated expanded perlite particles in place of prior art hollow ceramic or polymer microspheres. Furthermore, the panels of the invention have reduced weight compared with hydraulic cement panels. The panels will satisfy performance requirements listed above and may be distinguished from other prior art compositions discussed above which contain similar components, but are not capable of meeting all of the desired performance properties of the present structural cement panels.

The present invention relates to a system for residential and light commercial construction including a lightweight SCP panel. This panel is made from a mixture of inorganic binder and lightweight fillers which is meant to be used in a system in which all elements pass ASTM E-136.

SCP slurry compositions of the present invention specifically include calcium sulfate hemi-hydrate (gypsum), a hydraulic cement such as Portland cement, silica fume, lime, fine expanded perlite particles which are coated to be hydrophobic, superplasticizer and tartaric acid. In these compositions, fine expanded perlite is used as either partial or full replacement for hollow ceramic microsphere filler used in prior SCP formulations to provide lighter weight, reduced moisture absorption, improved wet durability and enhanced thermal stability, while maintaining the same levels of mechanical performance properties such as long term durability, freeze-thaw resistance and dimensional stability as the prior structural cement panels.

The expanded perlite in the present invention has a particle size range of 1 to 150 microns (micrometers) and is treated with a coating which makes the coated perlite hydrophobic. At the partial replacement level, this perlite displaces up to half of the microsphere volume, and at the full replacement level, the perlite displaces the entire microsphere fraction.

The present system having a horizontal shear diaphragm on framing, typically light gauge metal frame also is typically water durable. Preferably the horizontal shear diaphragm load carrying capacity of a system of the present invention will not be lessened by more than 25% (more preferably will not be lessened by more than 20%) when exposed to water in a test wherein a 2 inch (51 mm) head of water is maintained over ¾ inch (19 mm) thick SCP panels fastened on a 10 foot by 20 foot (3.048 to 6.096 meters) metal frame for a period of 24 hours. In this test, the 2 inch (51 mm) head is maintained by checking, and replenishing water, at 15 minute intervals.

Preferably the system of the present invention will not absorb more than 0.7 pounds per square foot (0.0034 grams per square meter) of water when exposed to water in a test wherein a 2 inch (51 mm) head of water is maintained over ¾ inch (19 mm) thick SCP panels fastened on a 10 foot by 20 foot (3.048 to 6.096 meters) metal frame for a period of 24 hours. In this test, the 2 inch (51 mm) head is maintained by checking, and replenishing water, at 15 minute intervals.

Also, combining non-combustible SCP panels with metal framing results in an entire system which resists swelling due to moisture. Preferably in the system of the present invention a 10 foot wide by 20 foot long by ¾ inch thick diaphragm of the SCP panels attached to a 10 foot by 20 foot (3.048 to 6.096 meters) metal frame will not swell more than 5% when exposed to a 2 inch (51 mm) head of water maintained over the SCP panels fastened on the metal frame for a period of 24 hours. In this test, the 2 inch (51 mm) head is maintained by checking, and replenishing water, at 15 minute intervals.

The system of the present invention may employ single layer or multi-layer SCP panels. In the multi-layer SCP panel the layers may be the same or different. For example, the SCP panel may have an inner layer of a continuous phase and at least one outer layer of a continuous phase on each opposed side of the inner layer, wherein at least one outer layer on each opposed side of the inner layer has a higher percentage of glass fibers than the inner layer. This has the ability to stiffen, strengthen and toughen the panel.

The present system is more lightweight than current structural cement panels while retaining the same shear strength. Thus, a present system having a horizontal diaphragm of ¾ inch (19 mm) thick SCP panel on metal frame facilitates efficient use of building volume for a given building footprint to permit maximization of building volume for the given building footprint. Thus, the present system may allow more floor to ceiling height or even a greater number of floors in zoning areas with building height restrictions.

The lightweight nature of this system typically avoids the dead load associated with metal pan deck/poured concrete systems. Less dead load also allows building comparable size structures on less stable soil possessing relatively low bearing capacities.

Moreover, adding fire resistant gypsum drywall, such as Type X gypsum wallboard, or other sound attenuating material can improve the sound insulation provided by the SCP floors or roofs. This can especially reduce IIC (impact noise). Typical materials to add include floor underlayment panels (to make a floor which is non-combustible from the bottom), FIBEROCK® brand interior panels (available from US Gypsum Corporation, Chicago, Ill.) to make a non-combustible floor), LEVELROCK® brand floor underlayment (available from US Gypsum Corporation, Chicago, Ill.)(to make a non-combustible floor), or acoustical plaster (to make a non-combustible floor). To receive the "Type X" designation under ASTM C 36, a gypsum wallboard product must be shown to achieve not less than a one hour fire resistance rating for ⅝" (16 mm) board or a ¾ hour fire resistance rating for ½" (12.7 mm) board applied in a single layer, nailed on each face of load-bearing wood framing members, when tested in accordance with the requirements of ASTM E 119, Methods of Fire Test of Building Constructions and Materials. An acoustic ceiling may also be applied to the underside of the floor-joists. The ceiling panels are attached to resilient channels or a suspension grid.

As the thickness of the board affects its physical and mechanical properties, e.g., weight, load carrying capacity, racking strength and the like, the desired properties vary according to the thickness of the board. Broadly, the thickness of a panel of the invention can be within the range of about 0.125 to 4.0 inches, with a more preferred thickness in the range of 0.25 to 2.0 inches, and a most preferred thickness in the range of about 0.40 to 1.0 Inches. Thus, for example, the desired properties which a shear rated panel with a nominal thickness of 0.75 inches (19.1 mm) should meet include the following.

When used as subfloors in floor sheathing applications per ICC-ES Acceptance Criteria AC-318, a typical panel of the present invention when tested according to ASTM E 661 over a span of 16, 20 or 24 inches (406, 508 or 610 mm) on center has an ultimate load capacity greater than 400 lbs (182 kg), before impact and an ultimate load capacity greater than 400 lbs (182 kg) after impact. The maximum deflection should be less than 0.125 inches (3.2 mm), before and after impact with a 200 lb (90.9 kg) load.

When used as single floors in floor sheathing applications per ICC-ES AC 318, a typical panel of the present invention, when tested according to ASTM E 661 over a span of 16, 20 or 24 inches (406, 508 or 610 mm) on center has an ultimate load capacity greater than 550 lbs. (250 kg.) before impact and an ultimate load capacity greater than 400 lbs. (182 Kg.) after impact. The maximum deflection before and after impact with a 200-lb (90.9 Kg.) load should be less than 0.078 inches (1.98 mm) 0.094 inches (2.39 mm) and 0.108 inches (2.74 mm) over spans of 16, 20 and 24 inches, respectively.

When used for roof sheathing applications per ICC-ES AC 318, a typical panel of the invention, when tested according to ASTM E 661 over a span of 16, 20 or 24 inches (406, 508 or 610 mm.) on center has an ultimate load capacity greater than 400 lbs. (182 Kg.) before impact and an ultimate load capacity greater than 300 lbs. (136 Kg.) after impact. The maximum deflection before and after impact with a 200-lb. (90.9) load should be less than 0.438 inches (11.1 mm.) 0.469 inches (11.9 mm.), 0.500 inches (12.7 mm.) and 0.500 inches (12.7 mm.) over spans of 16, 20 24 and 32 inches, respectively.

When used for floor sheathing applications per ICC-ES AC 318, a typical panel of the invention, when tested according to ASTM E 330, should have an ultimate uniform load capacity greater than 330 psf (pounds per square foot) and deflect no more than (span/360) at an allowable load of 100 psf. These requirements apply to both dry test conditions and wet test conditions (after 7 days of continuous wetting and then testing while wet).

When used for roof sheathing applications per ICC-ES AC 318, panels of the invention, when tested according to ASTM E 330 should have an ultimate uniform load capacity greater than 150 psf. and deflect no more than (span/240) at an allowable load of 35 psf. These requirements apply to both dry test conditions and wet test conditions (after seven days of continuous wetting and then tested wet).

Panels of the invention when tested according to PS2-04, Section 7.4, should demonstrate a minimum lateral fastener load of 210 lbs. (95.5 Kg.) in the dry state and 160 lbs. (72.2 Kg.) after seven days of continuous wetting and testing while wet.

Panels of the invention when tested according to ASTM D 1037, Sections 47-53, should demonstrate a minimum fastener withdrawal load of 20 lbs. (9.1 Kg.) in the dry state and 15 lbs. (6.8 Kg.) after seven days of continuous wetting and testing while wet.

Panels of the invention when tested according to ASTM D 1037, Sections 54-60, should demonstrate a minimum fastener pull-through load of 200 lbs. (90.9 Kg.) in the dry state and 150 lbs. (68.2 Kg.) after seven days of continuous wetting and testing while wet.

A 4×8 ft, ¾ inch thick panel (1.22×2.44 m, 19.1 mm thick) typically weighs no more than 156 lbs (71 kg) and preferably no more than 144 lbs (65.5 kg).

Typical compositions for embodiments of panels of the present invention which achieve the combination of low density, improved flexural strength, and nailability/cutability comprise inorganic binder (examples—gypsum-cement, Portland cement or other hydraulic cements) having, distributed throughout the full thickness of the panel, selected glass fibers, lightweight fillers of coated expanded perlite and superplasticizer/high-range water reducing admixtures (examples—polynapthalene sulfonates, polyacrylates, etc.). Hollow glass or ceramic microspheres can optional be used with the coated expanded perlite, although the use of the coated expanded perlite particles is preferred.

The panels may be single layer panels or multilayer panels. A typical panel is made from a mixture of water and inorganic binder with the selected glass fibers, lightweight ceramic microspheres and superplasticizer throughout the mixture. Other additives such as accelerating and retarding admixtures, viscosity control additives may optionally be added to the mixture to meet the demands of the manufacturing process involved.

A single or multi layer panel may also be provided with a sheet of mesh, e.g. fiber glass mesh if desired.

In embodiments having multiple (two or more) layers, the composition of the layers may be the same or different. For example, a multi-layer panel structure may be created to contain at least one outer layer having improved nailability and cutability or score and snap capability. This is provided by using a higher water-to-reactive powder (defined below) ratio in making the outer layer(s) relative to the core of the panel. A small thickness of the skin coupled with a small dosage of polymer content may improve the nailability without necessarily failing the non-combustibility test. Of course, high dosages of polymer content would lead to failure of the product in the non-combustibility test.

The glass fibers can be used alone or in combination with other types of non-combustible fibers such as steel fibers.

As previously discussed, there is a need for a light, non-combustible shear wall, floor and roofing systems to replace wood or metal frames sheathed with plywood OSB panels or current structural cement panels.

Another advantage is that the lighter weight structural panels of the present invention can also achieve a 2 hour fire resistance rating according to ASTM E-119 by employing the SCP panel, for example ¾ inch or 1 inch SCP panel on metal framing with Type X gypsum wallboard on the side of the metal framing opposed to the side upon which the SCP panel lies, while achieving improved thermal resistance compared to current SCP panels.

The present invention achieves the combination of low density and ductility required for panel handling and nailability with good flow properties, water durability and improved thermal properties by using coated expanded perlite particles uniformly distributed throughout the full thickness of the panel. This provided a panel with a lower water-to-reactive powder (defined below) ratio which allows for significant weight reduction in the weight of the resulting panel and improved strength compared to panels made with hollow ceramic microspheres or blends of ceramic microspheres and polymer spheres. The use of coated expanded perlite also makes a panel which can readily meet the test of non-combustibility by essentially eliminating a source of non-burnt carbon or organic in the panel from lightweight fillers like ceramic microspheres or polymer spheres.

For use in construction, the improved SCP panels should meet building code standards for shear resistance, load capacity, water-induced expansion, water durability, freeze-thaw durability, long term durability and resistance to combustion, as measured by recognized tests, such as ASTM E72, ASTM E 661, ASTM C 1704 and ASTM C 1185 or equivalent, as applied to structural plywood sheets. SCP panels are also tested under ASTM E-136 for non-combustibility—plywood does not meet this test.

The improved SCP panel should be capable of being cut with the circular saws used to cut wood.

The improved SCP panel should be dimensionally stable when exposed to water. It should expand less than 0.1% in either machine or cross-machine direction, as measured by ASTM C 1185, and the thickness swell should be less than 3% as measured by ASTM D 1037, Method B The water absorption of the panels of the present invention should not exceed 15% by weight when tested at an age of 28 days after manufacture according to ASTM C 1704.

When tested according to the method of ASTM C 1704, wet conditioned specimens of the panels of the invention should retain a minimum of 70% of the maximum load capacity and maximum deflection compared to a dry control specimen of the panel. Wet conditioning of the specimens is accomplished by submerging the specimens in 70±5° F. (21±3° C.) water for 48±2 hours and then blot drying the specimens until no free moisture is visible on the surface of the specimen before immediately commencing the test.

The improved SCP panel of the invention should retain a minimum of 75% of the control strength value after 50 freeze-thaw cycles, as determined by using the section applicable to panel freeze-thaw under ASTM C 1185.

Panels of the invention should demonstrate a minimum retention of 75% of the maximum load capacity and maximum deflection, when tested per ASTM C 1185, under the section applicable to long term durability, with conditioning initiated at an age of 28 days after manufacture.

The improved SCP panel should provide a bondable substrate for exterior finish systems.

The improved SCP panel should be non-combustible as determined by ASTM E136, without need to account for combustible components of prior art microsphere fillers.

The improved SCP panel of the invention should achieve a flame spread of 0 and a maximum smoke developed of 5 as determined by the method of ASTM E 84.

When used for floor sheathing applications at spans of 16, 20 or 24 inches (406, 508 or 610 mm.) on center, the moment capacity of the SCP panels, as determined by the method of ASTM C 1704, is at least 1,450 lbf-in/ft width in both the machine and cross-machine directions in the dry condition, and is at least 1,015 lbf-in/ft width in both the machine and cross-machine directions in the wet condition. These moment capacity values are in accordance with the requirements as established in the ICC-ES Acceptance Criteria AC-318 and the ASTM C-1705 Standard. The wet conditioning of the panels is described in paragraph [0044]. The bending stiffness of the dry specimens should be 223,000 lbf-in$^2$/ft width in both the machine and cross-machine directions as determined under the method in ASTM C 1704.

When used for roof sheathing applications at spans of 16, 20 or 24 inches (406, 508 or 610 mm.) on center, the moment capacity of the SCP panels, as determined by the method of ASTM C 1704, is at least 1,007 lbf-in/ft width in both the machine and cross-machine directions in the dry condition, and is at least 705 lbf-in/ft width in both the machine and cross-machine directions in the wet condition. The values are in accordance with the minimum moment capacity values as established in the ICC-ES Acceptance Criteria AC-318. The wet conditioning of the panels is described in paragraph [0044]. The bending stiffness of the dry specimens should be 129,051 lbf-in$^2$/ft width in both the machine and cross-machine directions as determined under the method in ASTM C 1704. At a span of 32 inches (813 mm.) on center, the panel should exhibit a dry moment capacity of 1,450 lbf-in/ft width, a wet moment capacity of 1,015 lbf-in/ft width and dry bending stiffness of 223,000 lbf-in$^2$/ft width.

For roof sheathing applications, panels of the invention should be tested for 25 cycles per ASTM C 1185, Section 15 at a minimum of 28 days after manufacture. After completion of the radiant heat portion of the first cycle testing, the panel should have a minimum retention of 75% of the maximum load and maximum deflection values as established by flexural testing compared to control panel specimens.

Panels of the invention should also exhibit a mold resistance value of 10 when tested in accordance with ASTM D 3273 and a mold resistance value of 1 or less when tested in accordance with ASTM G 21.

DETAILED DESCRIPTION OF THE INVENTION

Figure 1:
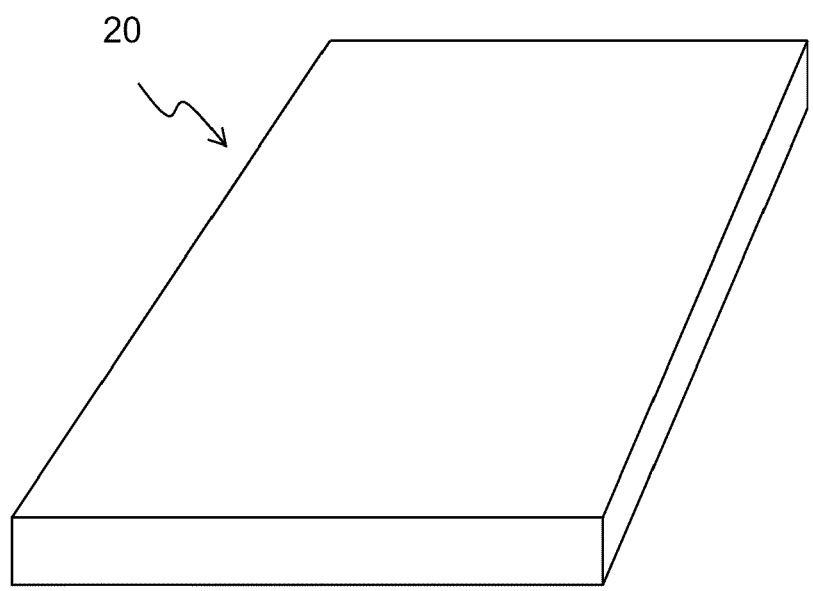
FIG. 1 is a perspective view of a single layer SCP panel of the present invention.

FIG. 1 is a schematic perspective view of a single layer SCP panel 20 of the present invention. The principal starting materials used to make such SCP panels are inorganic binder, e.g., calcium sulfate alpha hemihydrate, hydraulic cement, and pozzolanic materials, lightweight filler coated expanded perlite and optional additional, ceramic microspheres or glass microspheres, as well as superplasticizer, e.g., polynapthalene sulphonates and/or polyacrylates, water, and optional additives.

Figure 2:
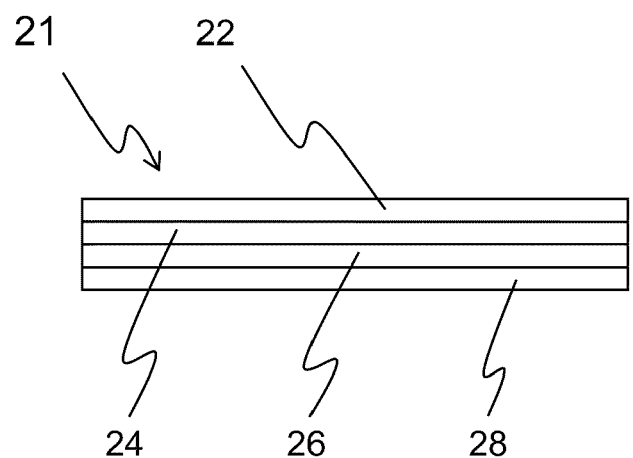
FIG. 2 is a fragmentary cross-section of a multi-layer SCP panel system of the present invention.

If desired the panel may have a single layer as shown in FIG. 1. However, the panel typically is made by a process which applies multiple layers which, depending upon how the layers are applied and cured as well as whether the layers have the same or different compositions, may or may not in the final panel product retain distinct layers. A multi-layer structure of a panel 21 having layers 22, 24, 26 and 28 is shown in FIG. 2. In the multi-layer structure the composition of the layers may be the same or different. The typical thickness of the layer(s) ranges between about 1/32 to 1.0 inches (about 0.75 to 25.4 mm). Where only one outer layer is used, it typically will be less than 3/8 of the total panel thickness.

Calcium Sulfate Hemihydrate

Calcium sulfate hemihydrate, which may be used in panels of the invention, is made from gypsum ore, a naturally occurring mineral, (calcium sulfate dihydrate $CaSO_4 \cdot 2H_2O$). Unless otherwise indicated, "gypsum" will refer to the dihydrate form of calcium sulfate. After being mined, the raw gypsum is thermally processed to form a settable calcium sulfate, which may be anhydrous, but more typically is the hemihydrate, $CaSO_4 \cdot \frac{1}{2}H_2O$. For the familiar end uses, the settable calcium sulfate reacts with water to solidify by forming the dihydrate (gypsum). The hemihydrate has two recognized morphologies, termed alpha hemihydrate and beta hemihydrate. These are selected for various applications based on their physical properties and cost. Both forms react with water to form the dihydrate of calcium sulfate. Upon hydration, alpha hemihydrate is characterized by giving rise to rectangular-sided crystals of gypsum, while beta hemihydrate is characterized by hydrating to produce needle-shaped crystals of gypsum, typically with large aspect ratio. In the present invention either or both of the alpha or beta forms may be used depending on the mechanical performance desired. The beta hemihydrate forms less dense microstructures and is preferred for low density products. The alpha hemihydrate forms more dense microstructures having higher strength and density than those formed by the beta hemihydrate. Thus, the alpha hemihydrate could be substituted for beta hemihydrate to increase strength and density or they could be combined to adjust the properties.

A typical embodiment for the inorganic binder used to make panels of the present invention comprises of hydraulic cement such as Portland cement, high alumina cement, pozzolan-blended Portland cement, or mixtures thereof.

Another typical embodiment for the inorganic binder used to make panels of the present invention comprises a blend containing calcium sulfate alpha hemihydrate, hydraulic cement, pozzolan, and lime.

Hydraulic Cement

ASTM defines "hydraulic cement" as follows: cement that sets and hardens by chemical interaction with water and is capable of doing so under water. There are several types of hydraulic cements that are used in the construction and building industries. Examples of hydraulic cements include Portland cement, slag cements such as blast-furnace slag cement and super-sulfated cements, calcium sulfoaluminate cement, high-alumina cement, expansive cements, white cement, and rapid setting and hardening cements. While calcium sulfate hemihydrate does set and harden by chemical interaction with water, it is not included within the broad definition of hydraulic cements in the context of this invention. All of the aforementioned hydraulic cements can be used to make the panels of the invention.

The most popular and widely used family of closely related hydraulic cements is known as Portland cement. ASTM C 150 defines "Portland cement" as hydraulic cement produced by pulverizing clinker consisting essentially of hydraulic calcium silicates, usually containing one or more of the forms of calcium sulfate as an integral addition. To manufacture Portland cement, an intimate mixture of limestone, argillaceous rocks and clay is ignited in a kiln to produce the clinker, which is then further processed. As a result, the following four main phases of Portland cement are produced: tricalcium silicate ($3CaO \cdot SiO_2$, also referred to as $C_3S$), dicalcium silicate ($2CaO \cdot SiO_2$, called $C_2S$), tricalcium aluminate ($3CaO \cdot Al_2O_3$ or $C_3A$), and tetracalcium aluminoferrite ($4CaO \cdot Al_2O_3 \cdot Fe_2O_3$ or $C_4AF$). Other compounds present in minor amounts in Portland cement include calcium sulfate and other double salts of alkaline sulfates, calcium oxide, and magnesium oxide. Of the various recognized classes of Portland cement, Type III Portland cement (ASTM classification) is preferred for making the panels of the invention, because of its fineness it has been found to provide greater strength. The other recognized classes of hydraulic cements including slag cements such as blast-furnace slag cement and super-sulfated cements, calcium sulfoaluminate cement, high-alumina cement, expansive cements, white cement, rapidly setting and hardening cements such as regulated set cement and VHE cement, and the other Portland cement types can also be successfully used to make the panels of the present invention. The slag cements and the calcium sulfoaluminate cement have low alkalinity and are also suitable to make the panels of the present invention.

It is to be understood that, as used here, "hydraulic cement" does not include gypsum, which does not gain strength under water, although typically some gypsum is included in Portland cement.

When cement boards are to be made, the Portland cement will typically be in the form of very fine particles such that the particle surface area is greater than 4,000 cm$^2$/gram and typically between 5,000 to 6,000 cm$^2$/gram as measured by the Blaine surface area method (ASTM C 204). Of the various recognized classes of Portland cement, ASTM Type III Portland cement is typically most preferred in the cementitious reactive powder of cementitious compositions, due to its relatively faster reactivity and high early strength development.

In the present invention, the need for the use of Type III Portland cement is minimized and relatively fast early age strength development can be obtained using other cements instead of Type III Portland cement. The other recognized types of cements which may be used to replace or supplement Type III Portland cement in the composition of the invention include Type I Portland cement or other hydraulic cements including white cement, slag cements such as blast-furnace slag cement, pozzolan blended cements, expansive cements, sulfo-aluminate cements, and oil-well cements.

Fibers

Glass fibers are commonly used as insulating material, but they have also been used as reinforcing materials with various matrices. The fibers themselves provide tensile strength to materials that may otherwise be subject to brittle failure. The fibers may break when loaded, but the usual mode of failure of composites containing glass fibers occurs from degradation and failure of the bond between the fibers and the continuous phase material. Thus, such bonds are important if the reinforcing fibers are to retain the ability to increase ductility and strengthen the composite over time. Typically used are alkali-resistant glass fibers (AR glass fibers), for example Nippon Electric Glass (NEG) 350Y. Such fibers have been found to provide superior bonding strength to the matrix and are, thus, preferred for panels of the invention.

The glass fibers are typically monofilaments that have a diameter from about 5 to 25 microns (micrometers), more typically a diameter from about 10 to 15 microns (micrometers). The filaments generally are combined into 100 filament strands, which may be bundled into rovings containing about 50 strands. The strands or rovings will generally be chopped into suitable filaments and bundles of filaments, for example, about 0.25 to 3 inches (6.3 to 76 mm) long, typically 0.25 to 2 inches (6.3 to 50 mm) or 1 to 2 inches (25 or 50 mm) long. The fibers have random orientation, providing isotropic mechanical behavior in the plane of the panel.

It is also possible to include other non-combustible fibers in the panels of the invention, for example, steel fibers are also potential additives.

To promote non-combustibility, an embodiment may have an absence of polymer fibers.

Pozzolanic Materials

As has been mentioned, most Portland and other hydraulic cements produce lime during hydration (curing). It is desirable to react the lime to reduce attack on glass fibers. It is also known that when calcium sulfate hemihydrate is present, it reacts with tricalcium aluminate in the cement to form ettringite, which can result in undesirable cracking of the cured product. This is often referred to in the art as "sulfate attack." Such reactions may be prevented by adding "pozzolanic" materials, which are defined in ASTM C618-97 as " . . . siliceous or siliceous and aluminous materials which in themselves possess little or no cementitious value, but will, in finely divided form and in the presence of moisture, chemically react with calcium hydroxide at ordinary temperatures to form compounds possessing cementitious properties." One often used pozzolanic material is silica fume, finely divided amorphous silica which is the product of silicon metal and ferro-silicon alloy manufacture. Characteristically, it has high silica content and low alumina content. Various natural and man-made materials have been referred to as having pozzolanic properties, including pumice, perlite, diatomaceous earth, tuff, trass, metakaolin, microsilica, ground granulated blast furnace slag, and fly ash. While silica fume is a particularly convenient pozzolan for use in the panels of the invention, other pozzolanic materials may be used. In contrast to silica fume, metakaolin, ground granulated blast furnace slag, and pulverized fly ash have a much lower silica content and large amounts of alumina, but can be effective pozzolanic materials. When silica fume is used, it will constitute about 5 to 30 wt. %, preferably 10 to 15 wt. %, of the reactive powders (i.e., hydraulic cement, calcium sulfate alpha hemihydrate, silica fume, and lime). If other pozzolans are substituted, the amounts used will be chosen to provide chemical performance similar to silica fume.

The cementitious reactive powder blend of the cementitious composition may contain high concentrations of mineral additives, such as pozzolanic materials and/or non-pozzolanic aggregates, for example, calcium carbonate, mica, talc, etc.

ASTM C618-97 defines pozzolanic materials as "siliceous or siliceous and aluminous materials which in themselves possess little or no cementitious value, but will, in finely divided form and in the presence of moisture, chemically react with calcium hydroxide at ordinary temperatures to form compounds possessing cementitious properties." Various natural and man-made materials have been referred to as pozzolanic materials possessing pozzolanic properties. Some examples of pozzolanic materials include pumice, diatomaceous earth, silica fume, tuff, trass, rice husk, metakaolin, ground granulated blast furnace slag, and fly ash. All of these pozzolanic materials can be used either singly or in combined form as part of the cementitious reactive powder of the invention.

Pumice used as pozzolanic mineral additive is a non-hydrated form and falls within the ASTM C618-97 definition of pozzolanic materials as "siliceous or siliceous and aluminous materials which in themselves possess little or no cementitious value, but will, in finely divided form and in the presence of moisture, chemically react with calcium hydroxide at ordinary temperatures to form compounds possessing cementitious properties."

Fly ash is the preferred pozzolan in the cementitious reactive powder blend of the invention. Fly ashes containing high calcium oxide and calcium aluminate content (such as Class C fly ashes of ASTM C618 standard) are preferred as explained below. Other mineral additives such as calcium carbonate, clays, and crushed mica may also be included.

Fly ash is a fine powder byproduct formed from the combustion of coal. Electric power plant utility boilers burning pulverized coal produce most commercially available fly ashes. These fly ashes consist mainly of glassy spherical particles as well as residues of hematite and magnetite, char, and some crystalline phases formed during cooling. The structure, composition and properties of fly ash particles depend upon the structure and composition of the coal and the combustion processes by which fly ash is formed. ASTM C618 standard recognizes two major classes of fly ashes for use in concrete—Class C and Class F. These two classes of fly ashes are derived from different kinds of coals that are a result of differences in the coal formation processes occurring over geological time periods. Class F fly ash is normally produced from burning anthracite or bituminous coal, whereas Class C fly ash is normally produced from lignite or sub-bituminous coal.

The ASTM C618 standard differentiates Class F and Class C fly ashes primarily according to their pozzolanic properties. Accordingly, in the ASTM C618 standard, the major specification difference between the Class F fly ash and Class C fly ash is the minimum limit of $SiO_2+Al_2O_3+Fe_2O_3$ in the composition. The minimum limit of $SiO_2+Al_2O_3+Fe_2O_3$ for Class F fly ash is 70% and for Class C fly ash is 50%. Thus, Class F fly ashes are more pozzolanic than the Class C fly ashes. Although not explicitly recognized in the ASTM C618 standard, Class C fly ashes typically contain high calcium oxide content. Presence of high calcium oxide content makes Class C fly ashes possess cementitious properties leading to the formation of calcium silicate and calcium aluminate hydrates when mixed with water. As will be seen in the examples below, Class C fly ash has been found to provide superior results, particularly in the preferred formulations in which high alumina cement and gypsum are not used.

Chemically Coated Expanded Perlite

The lightweight panels employed in systems of the present invention typically have a density of 50 to 100 pounds per cubic foot, preferably 65 to 85 pounds per cubic foot, more preferably 70 to 80 pounds per cubic foot. In contrast, typical Portland cement based panels without wood fiber will have densities in the 95 to 110 pcf range, while the Portland cement based panels with wood fibers will be about the same as SCP (about 65 to 85 pcf).

To assist in achieving these low densities the panels are provided with lightweight coated expanded perlite filler particles. The expanded perlite filler is about 2-10 weight %, about 7.5-40 volume % of the cementitious composition slurry (on a wet basis). The expanded perlite filler particles have a median particle diameter typically between 20-500 microns or 20 to 250 microns, preferably between 20-150 microns, more preferably between 20-90 microns, and most preferably between 20-60 microns. Also, the expanded perlite filler particles have an effective particle density (specific gravity) preferably less than 0.50 g/cc, more preferably less than 0.40 g/cc and most preferably less than 0.30 g/cc.

The expanded perlite particles serve an important purpose in the panels of the invention, which would otherwise be heavier than is desirable for building panels.

The expanded perlite particles have a hydrophobic coating. Typically, the expanded perlite particles are chemically treated with one or more silane, siloxane, or silicone coatings or a mixture thereof.

Figure 26:
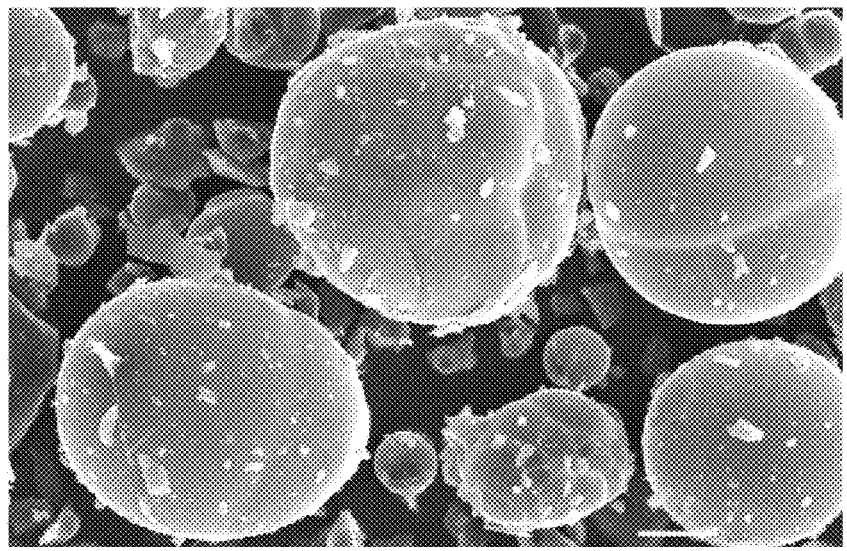
FIG. 26 is a photograph of the lightweight coated expanded perlite used in the panel of the invention.
Figure 27:
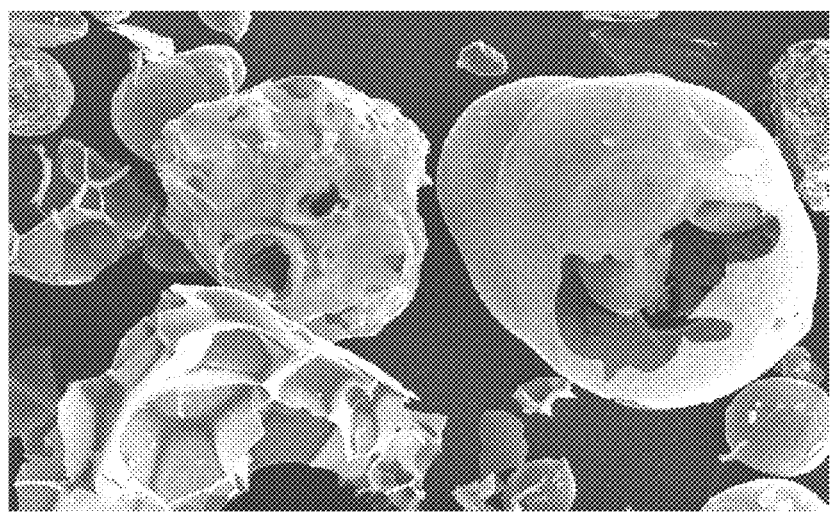
FIG. 27 is a photograph of a crushed perlite particle showing the honeycomb microstructure of the perlite of the invention.

A scanning electron micrograph of the coated perlite particles of the invention is shown in FIG. 26. The perlite particles of this invention are not completely hollow but have a honeycomb internal microstructure, as shown in the scanning electron micrograph in FIG. 27. The honeycomb microstructure is essentially created by thin walls that run randomly within the hollow space of the perlite particle. The multiple walls present in the perlite particle intersect each other randomly and thereby compartmentalize the overall particle volume into small sections. This honeycomb microstructure provides several benefits to the perlite particle and the cementitious compositions of the invention. Important benefits provided by the of honeycomb microstructure include:

1. Reduced particle water absorption: As the particle internally is subdivided into small sections due to its honeycomb construction, the migration of water from one section to another within the particle is interrupted by the internal walls. As a consequence, the absolute water absorption of the perlite particle is reduced very significantly. Perlite particles with lower water absorption are beneficial in the present invention, since they help to reduce the water demand of the cementitious slurry and enhance the mechanical and durability performance of the finished product.
2. Increased particle stiffness and strength: The honeycomb walls within the particle help to substantially increase the stiffness and strength of the particle. As a result, the perlite particles are less prone to damage during manufacture transportation and conveying at various stages of their life cycle. Moreover, the relatively high particle stiffness and strength are also extremely beneficial in various mixing operations for preparing cementitious slurries where the particles are subjected to extensive shearing and crushing actions. The high particle stiffness and strength help to maintain the particle integrity under aggressive mixing conditions.

As a result, the perlite particles are able to maintain their lightweight property and low water absorption when used in manufacture of cement panel products. It should be noted that with crushing and breakage of perlite particles, the particle density increases significantly thereby diminishing the lightweight and low water absorption The perlite may be coated with silicone, silane or siloxane coatings such as dimethyl silicone, dimethydichlorosilane or polydimethylsiloxane. If desired, coatings of titanates or zirconates may be employed. Typically the coatings are provided in an amount of 0.01 to 3%, more typically 0.01 to 2%, by weight of the uncoated weight of the perlite particle. The coatings on the perlite are typically cross linked hydrophobic film forming compounds. Typical silicones are organo-functional silanes having the general formula $R—SiX_3$ wherein R is selected from the group consisting of alkoxy and acetoxy such as acrylate, methacrylate, glycidoxy, epoxy propoxy, epoxy cyclohexyl and vinyl and X is selected from the group consisting of halogen, alkoxy and acetoxy.

Furthermore, the coated expanded perlite filler particle size allows formation of an effective-water-tight closed cell particle structure with the applying of the chemical coating. The use of the selected coated expanded perlite filler is important to allowing preparation of workable and processable cementitious slurries at low water usage rates. Lower amounts of water in the composition results in a product having superior mechanical properties and physical characteristics. The most preferred chemical coating compounds for making perlite particles water-tight and water repellant are alkyl alkoxy silanes. Octyltriethoxy silane represents the most preferred alkyl alkoxy silane to coat perlite for using with the cementitious compositions of this invention.

One of the preferred commercially available chemically coated perlite fillers is SIL-CELL 35-23 available from Silbrico Corporation. SIL-CELL 35-23 perlite particles are chemically coated with alkyl alkoxy silane compound. Another preferred chemically coated perlite filler is SIL-CELL 35-34 available from Silbrico Corporation. SIL-CELL 35-34 perlite particles are also useful in cementitious compositions of the invention and are coated with silicone compound. DICAPERL 2010 and DICAPERL 2020 are other commercial coated perlite filler products produced by Grefco Minerals Inc. which are also preferred in this invention. DICAPERL 2010 perlite, with alkyl alkoxy silane compound is particularly preferred in the cementitious compositions of the invention. DICAPERL 2020 perlite, coated with silicone compound is also useful in the compositions of this invention.

Another very useful property of the perlite fillers of the invention is that they display pozzolanic properties because of their small particle size and silica-based chemical nature. Owing to their pozzolanic behavior, the selected perlite fillers of the invention improve chemical and water durability of the cementitious composites while developing improved interfaces and enhanced bonding with the cementitious binders and other ingredients present in the mixture.

Yet another extremely important benefit results from the small size of the perlite filler particles of this invention. Selected perlite fillers of the invention enhance the overall amount of very fine particles (less than 75 microns) present in the composition. Presence of high content of fine particles in the composition is extremely useful in rapid processing of fiber reinforced structural cement panels as it helps to improve the bond between the cementitious slurry and reinforcing fiber. Improved bond between cementitious slurry and reinforcing fiber leads to faster panel processing speeds, and improved production recoveries.

Additional Lightweight Fillers/Microspheres

Used as lightweight fillers, the microspheres help to lower the average density of the product. When the microspheres are hollow, they are sometimes referred to as microballoons.

The microspheres are either non-combustible themselves or, if combustible, added in sufficiently small amounts to not make the SCP panel combustible. Typical lightweight fillers for including in mixtures employed to make panels of the present invention are selected from the group consisting of ceramic microspheres, polymer microspheres, glass microspheres, and/or fly ash cenospheres.

Ceramic microspheres can be manufactured from a variety of materials and using different manufacturing processes. Although a variety of ceramic microspheres can be utilized as a filler component in the panels of the invention, the preferred ceramic microspheres of the invention are produced as a coal combustion by-product and are a component of the fly ash found at coal fired utilities, for example, EXTENDO-SPHERES-SG made by Kish Company Inc., Mentor, Ohio or FILLITE® Brand ceramic microspheres made by Tolsa., Suwanee, Ga. USA. The chemistry of the preferred ceramic microspheres of the invention is predominantly silica ($SiO_2$) in the range of about 50 to 75 wt. % and alumina ($Al_2O_3$) in the range of about 15 to 40 wt. %, with up to 35 wt. % of other materials. The preferred ceramic microspheres of the invention are hollow spherical particles with diameters in the range of 10 to 500 microns (micrometers), a shell thickness typically about 10% of the sphere diameter, and a particle density preferably about 0.50 to 0.80 g/mL. The crushing strength of the preferred ceramic microspheres of the invention is greater than 1500 psi (10.3 MPa) and is preferably greater than 2500 psi (17.2 MPa).

Preference for ceramic microspheres in the panels of the invention primarily stems from the fact that they are about three to ten times stronger than most synthetic glass microspheres. In addition, the preferred ceramic microspheres of invention are thermally stable and provide enhanced dimensional stability to the panel of invention. Ceramic microspheres find use in an array of other applications such as adhesives, sealants, caulks, roofing compounds, PVC flooring, paints, industrial coatings, and high temperature-resistant plastic composites. Although they are preferred, it should be understood that it is not essential that the microspheres be hollow and spherical, since it is the particle density and compressive strength which provide the panel of the invention with its low weight and important physical properties. Alternatively, porous irregular particles may be substituted, provided that the resulting panels meet the desired performance.

The polymer microspheres, if present, are typically hollow spheres with a shell made of polymeric materials such as polyacrylonitrile, polymethacrylonitrile, polyvinyl chloride or polyvinylidine chloride, or mixtures thereof. The shell may enclose a gas used to expand the polymeric shell during manufacture. The outer surface of the polymer microspheres may have some type of an inert coating such as calcium carbonate, titanium oxides, mica, silica, and talc. The polymer microspheres have a particle density preferably about 0.02 to 0.15 g/ml and have diameters in the range 10 to 350 microns (micrometers). The presence of polymer microspheres may facilitate simultaneous attainment of low panel density and enhanced cutability and nailability.

Other lightweight fillers, for example glass microspheres, hollow alumino-silicate cenospheres or microspheres derived from fly ash, are also suitable for including in mixtures in combination with or in place of ceramic microspheres employed to make panels of the present invention.

The glass microspheres typically are made of alkali resistant glass materials and may be hollow. Typical glass microspheres are available from GYPTEK INC., Suite 135, 16 Midlake Blvd SE, Calgary, AB, T2X 2X7, CANADA.

Other Chemical Additives and Ingredients

Other additives including water reducing agents such as superplasticizer, shrinkage control agents, slurry viscosity modifying agents (thickeners), coloring agents and internal curing agents, may be included as desired depending upon the processability and application of the cementitious composition of the invention.

Chemical additives such as water reducing agents (superplasticizers) may be included in the compositions of the invention and added in the dry form or in the form of a solution. Superplasticizers help to reduce the water demand of the mixture. Examples of super plasticizers include polynapthalene sulfonates, polyacrylates, polycarboxylates, lignosulfonates, melamine sulfonates, and the like.

Depending upon the type of superplasticizer used, the weight ratio of the superplasticizer (on dry powder basis) to the reactive cementitious powder typically will be about 2 wt. % or less, preferably about 0.1 to 1.0 wt. %, more preferably about 0.0 to 0.50 wt. %, and most preferably about 0.0 to 0.20 wt. %. Thus, for example, when superplasticizer is present in the range 0.1 to 1.0 wt. %, for every 100 pounds of cementitious reactive powder in the mixture, there may be about 0.1 to 1 pounds of superplasticizer.

Other chemical admixtures such as shrinkage control agents, coloring agents, viscosity modifying agents (thickeners) and internal curing agents may also be added in the compositions of the invention if desired.

Aggregates and Fillers

While the disclosed cementitious reactive powder blend defines the rapid setting component of the cementitious composition of the invention, it will be understood by those skilled in the art that other materials may be included in the composition depending on its intended use and application.

Depending on the amount of coated expanded perlite used and the choice of additional lightweight filler selected, the weight ratio of the lightweight filler to the reactive powder blend may be typically 2-90%, preferably 4-50% and more preferably 8-40%.

Moisture content of aggregates adversely affects the setting time of the cementitious mixtures. Thus, aggregates and fillers having low water content are preferred in the present invention.

Formulation of SCP Panels

The components used to make the shear resistant panels of the invention include hydraulic cement, calcium sulfate alpha hemihydrate, an active pozzolan such as silica fume, lime, coated expanded hydrophobic perlite particles, with or without optional hollow ceramic or glass microspheres, alkali-resistant glass fibers, superplasticizer (e.g., sodium salt of polynapthalene sulfonate), and water. Typically, both hydraulic cement and calcium sulfate alpha hemihydrate are present. Long term durability of the composite is compromised if calcium sulfate alpha hemihydrate is not present along with silica fume. Water/moisture durability is compromised when Portland cement is not present. Small amounts of accelerators and/or retarders may be added to the composition to control the setting characteristics of the green (i.e., uncured) material. Typical non-limiting additives include accelerators for hydraulic cement such as calcium chloride, accelerators for calcium sulfate alpha hemihydrate such as gypsum, retarders such as DTPA (diethylene triamine pentacetic acid), tartaric acid or an alkali salt of tartaric acid (e.g., potassium tartrate), shrinkage reducing agents such as glycols. The SCP panels of the invention do not contain added foaming agents and contain no entrained air.

Panels of the invention will include a continuous phase in which alkali-resistant glass fibers and light weight filler, e.g., microspheres, are uniformly distributed. The continuous phase results from the curing of an aqueous mixture of the reactive powders, i.e., blend of hydraulic cement, calcium sulfate alpha hemihydrate, pozzolan, and lime), preferably including superplasticizer and/or other additives.

TABLE 1 shows weight proportions of ingredients in the reactive powders (inorganic binder) of the present invention, e.g., hydraulic cement, calcium sulfate alpha hemihydrate, pozzolan and lime, based on dry weight of 100 parts of the reactive powder.

TABLE 1A lists weight proportions of ingredients in the cementitious compositions to be mixed with water to form slurries to form panels of the present invention, e.g., reactive powders, expanded coated perlite filler, and glass fibers, based on dry weight of 100 parts of composition.

TABLE 1B lists weight proportions of ingredients in the cementitious compositions to be mixed with water to form slurries to form panels of the present invention, e.g., of reactive powders, expanded coated perlite and glass fibers when ceramic microspheres are also used as filler, based on dry weight of 100 parts of composition.

TABLE 1

Reactive Powder Weight Proportion (%, dry basis)

| Reactive Powder | Broad | Typical | Preferred |
|---|---|---|---|
| Calcium Sulfate Alpha Hemihydrate | 25 to 75 | 35-70 | 45-65 |
| Hydraulic Cement | 10 to 75 | 15-60 | 20-50 |
| Lime | 0 to 3.5 | 0.2-3.5 | 0.75-1.25 |
| Pozzolan | 5 to 30 | 7.5-25 | 10-20 |

TABLE 1A

Cementitious Composition Weight Proportion (%, dry basis)

| Cementitious Composition | Broad (%, dry basis) | Typical (%, dry basis) | Preferred (%, dry basis) |
|---|---|---|---|
| Reactive Powder | 60-95 | 70-93 | 80-90 |
| Coated Expanded Perlite | 3-25 | 4-20 | 7-15 |
| Glass Fibers | 3-16 | 4-10 | 5-8 |

TABLE 1B

Cementitious Composition Weight Proportion (%, dry basis)

| Cementitious Composition | Broad (%, dry basis) | Typical (%, dry basis) | Preferred (%, dry basis) |
|---|---|---|---|
| Reactive Powder | 50-95 | 65-90 | 70-85 |
| Coated Expanded Perlite | 1-20 | 2-15 | 2-6 |
| Ceramic Microspheres | 1-25 | 5-22 | 10-20 |
| Glass Fibers | 3-16 | 4-10 | 5-8 |

Lime is not required in all formulations of the invention, but it has been found that adding lime provides superior panels and it usually will be added in amounts greater than about 0.2 wt. %. Thus, in most cases, the amount of lime in the reactive powders will be about 0.2 to 3.5 wt. %.

In accordance with the embodiments of the present invention, there is generally sufficient non-combustible coated expanded perlite, which contains essentially no unburned carbon, and little or no hollow ceramic microspheres which contain unburned carbon to cause the SCP panel to become combustible.

In the embodiments of the present invention, slurry compositions of the present invention do not include foaming agents and the slurry does not require use of any entrained air to reduce the density of the panel.

The panel may be made as a single layer or as multiple layers. Typical addition rates for water range between 35 to 70% of the weight of reactive powders and particularly greater than 60% up to 70% when the ratio of water-to-reactive powders is adjusted to reduce panel density and improve nailability, and typical addition rates for superplasticizer will range between 1 to 8% of the weight of reactive powders. The preferable thickness of the outer layer(s) ranges between 1/32 to 4/32 inches (0.8 to 3.2 mm) and the thickness of the outer layer when only one is used will be less than 3/8 of the total thickness of the panel.

In multi layer embodiments with one or more core layers and opposed outer layers, both the core and outer layer(s) of this embodiment of the present invention, independently have a composition as described above, for example, in TABLES 1, 1A, and 1B.

If desired at least one outer layer has a higher percentage of glass fibers than the inner layer. If desired at least one outer layer has improved nailability resulting from increasing the water-to-cement ratio in the outer layer(s) relative to the inner layer(s), and/or changing the amount of filler, and/or adding an amount of polymer microspheres in the outer layer(s) relative to the inner layer(s). The amount of polymer microspheres being sufficiently small for the panel to remain non-combustible.

Making a Panel of the Invention

The reactive powders, e.g., blend of hydraulic cement, calcium sulfate alpha hemihydrate, pozzolan, and lime), and lightweight filler, e.g., coated expanded perlite particles, are blended in the dry state in a suitable making mixer.

Then, water, a superplasticizer (e.g., a polycarboxylated ether), and the pozzolan (e.g., silica fume or metakaolin) are mixed in another mixer for 1 to 5 minutes. If desired, a retarder (e.g., potassium tartrate) is added at this stage to control the setting characteristics of the slurry. The dry ingredients are added to the mixer containing the wet ingredients and mixed for 2 to 10 minutes to form smooth homogeneous slurry.

The slurry is then combined with glass fibers, in any of several ways, with the objective of obtaining a uniform slurry mixture. The cementitious panels are then formed by pouring the slurry containing fibers into an appropriate mold of desired shape and size. If necessary, vibration is provided to the mold to obtain good compaction of material in the mold. The panel is given required surface finishing characteristics using an appropriate screed bar or trowel.

One of a number of methods to make multi-layer SCP panels is as follows. The reactive powders, e.g., blend of hydraulic cement, calcium sulfate alpha hemihydrate, pozzolan, and lime), and lightweight filler comprising coated expanded perlite particles, are blended in the dry state in a suitable mixer. Then, water, a superplasticizer (e.g., a polycarboxylated ether), and the pozzolan (e.g., silica fume or metakaolin) are mixed in another mixer for 1 to 5 minutes. If desired, a retarder (e.g., potassium tartrate) is added at this stage to control the setting characteristics of the slurry. The dry ingredients and the wet ingredients are blended together in a mixer for less than 10 minutes to form a smooth homogeneous slurry.

The slurry may be combined with the glass fibers in several ways, with the objective of obtaining a uniform mixture. The glass fibers typically will be in the form of rovings that are chopped into short lengths. In a preferred embodiment, the slurry and the chopped glass fibers are concurrently sprayed into a panel mold. Preferably, spraying is done in a number of passes to produce thin layers, preferably up to about 0.25 inches (6.3 mm) thick, which are built up into a uniform panel having no particular pattern and with a thickness of ¼ to 1 inch (6.3 to 25.4 mm). For example, in one application, a 3×5 ft (0.91×1.52 m) panel was made with six passes of the spray in the length and width directions. As each layer is deposited, a roller may be used to assure that the slurry and the glass fibers achieve intimate contact. The layers may be leveled with a screed bar or other suitable means after the rolling step. Typically, compressed air will be used to atomize the slurry. As it emerges from the spray nozzle, the slurry mixes with glass fibers that have been cut from a roving by a chopper mechanism mounted on the spray gun. The uniform mixture of slurry and glass fibers is deposited in the panel mold as described above.

If desired the outer surface layers of the panel may contain polymer spheres, or be otherwise constituted, in order that the fasteners used to attach the panel to framing can be driven easily, provided the amount of polymer spheres do not contain unburned carbon in amounts which would make the final panel combustible. The preferable thickness of such layers will be about 1/32 inches to 4/32 inches (0.8 to 3.2 mm). The same procedure described above by which the core of the panel is made may be used to apply the outer layers of the panel.

Another method of making panels of the present invention is by using the process steps disclosed in U.S. Pat. No. 7,445,738 incorporated herein by reference. U.S. Pat. No. 7,445,738 discloses after one of an initial deposition of loosely distributed, chopped fibers or a layer of slurry upon a moving web, fibers are deposited upon the slurry layer. An embedment device compacts the recently deposited fibers into the slurry, after which additional layers of slurry, then chopped fibers are added, followed by more embedment. The process is repeated for each layer of the board, as desired. Upon completion, the board has a more evenly distributed fiber component, which results in relatively strong panels without the need for thick mats of reinforcing fibers, as taught in prior art production techniques for cementitious panels.

More specifically, U.S. Pat. No. 7,445,738 discloses a multi-layer process for producing structural cementitious panels, including: (a.) providing a moving web; (b.) one of depositing a first layer of loose fibers and (c.) depositing a layer of settable slurry upon the web; (d.) depositing a second layer of loose fibers upon the slurry; (e.) embedding the second layer of fibers into the slurry; and (f.) repeating the slurry deposition of step (c.) through step (d.) until the desired number of layers of settable fiber-enhanced slurry in the panel is obtained.

Figure 3:
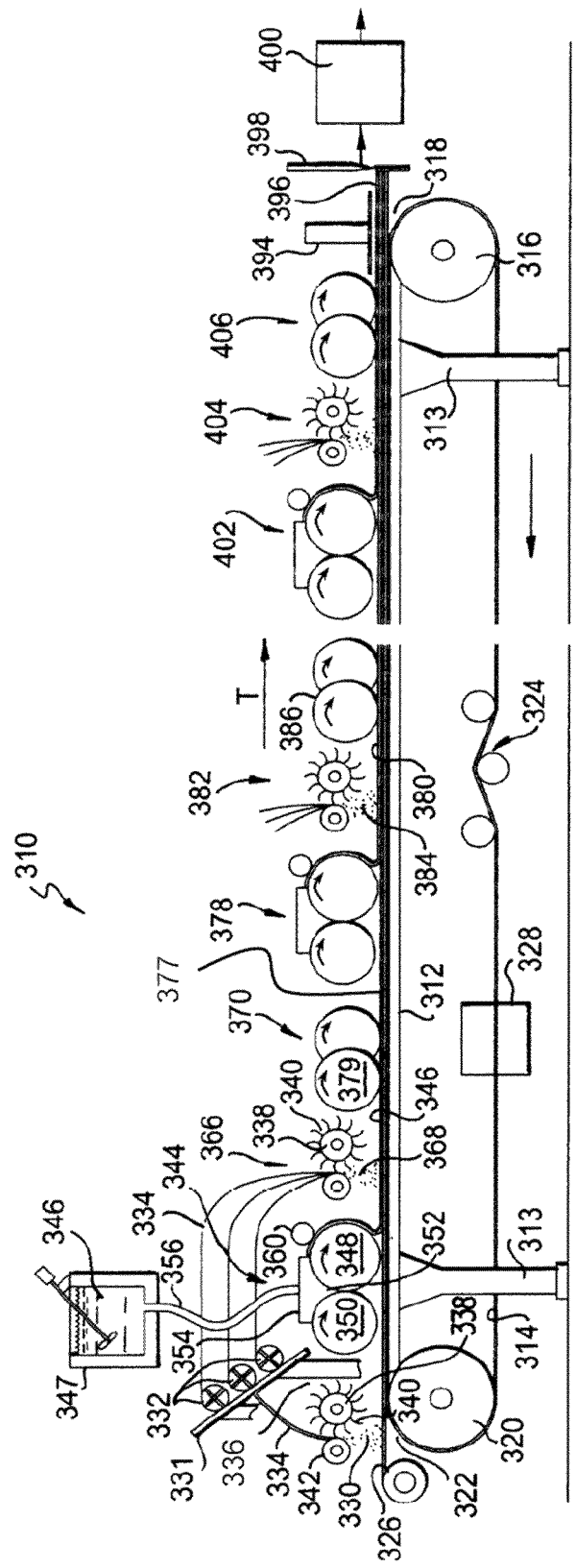
FIG. 3 is a diagrammatic elevational view of an apparatus which is suitable for performing the process for making the SCP panel of the present invention.

FIG. 3 is a diagrammatic elevational view of an apparatus which is suitable for performing the process of U.S. Pat. No. 7,445,738. Referring now to FIG. 3, a structural panel production line is diagrammatically shown and is generally designated 310. The production line 310 includes a support frame or forming table 312 having a plurality of legs 313 or other supports. Included on the support frame 312 is a moving carrier 314, such as an endless rubber-like conveyor belt with a smooth, water-impervious surface, however porous surfaces are contemplated. As is well known in the art, the support frame 312 may be made of at least one table-like segment, which may include designated legs 313. The support frame 312 also includes a main drive roll 316 at a distal end 318 of the frame, and an idler roll 320 at a proximal end 322 of the frame. Also, at least one belt tracking and/or tensioning device 324 is preferably provided for maintaining a desired tension and positioning of the carrier 314 upon the rolls 316, 320.

Also, in the preferred embodiment, a web 326 of Kraft paper, release paper, and/or other webs of support material designed for supporting slurry prior to setting, as is well known in the art, may be provided and laid upon the carrier 314 to protect it and/or keep it clean. However, it is also contemplated that the panels produced by the present line 310 are formed directly upon the carrier 314. In the latter situation, at least one belt washing unit 328 is provided. The carrier 314 is moved along the support frame 312 by a combination of motors, pulleys, belts or chains which drive the main drive roll 316 as is known in the art. It is contemplated that the speed of the carrier 314 may vary to suit the application.

In the apparatus of FIG. 3, structural cementitious panel production is initiated by one of depositing a layer of loose, chopped fibers 330 or a layer of slurry upon the web 326. An advantage of depositing the fibers 330 before the first deposition of slurry is that fibers will be embedded near the outer surface of the resulting panel. A variety of fiber depositing and chopping devices are contemplated by the present line 310, however the preferred system employs at least one rack 331 holding several spools 332 of fiberglass cord, from each of which a cord 334 of fiber is fed to a chopping station or apparatus, also referred to as a chopper 336.

The chopper 336 includes a rotating bladed roll 338 from which project radially extending blades 340 extending transversely across the width of the carrier 314, and which is disposed in close, contacting, rotating relationship with an anvil roll 342. In the preferred embodiment, the bladed roll 338 and the anvil roll 342 are disposed in relatively close relationship such that the rotation of the bladed roll 338 also rotates the anvil roll 342, however the reverse is also contemplated. Also, the anvil roll 342 is preferably covered with a resilient support material against which the blades 340 chop the cords 334 into segments. The spacing of the blades 340 on the roll 338 determines the length of the chopped fibers. As is seen in FIG. 3, the chopper 336 is disposed above the carrier 314 near the proximal end 322 to maximize the productive use of the length of the production line 310. As the fiber cords 334 are chopped, the fibers 330 fall loosely upon the carrier web 326.

Next, a slurry feed station, or a slurry feeder 344 receives a supply of slurry 346 from a remote mixing location 347 such as a hopper, bin or the like. It is also contemplated that the process may begin with the initial deposition of slurry upon the carrier 314. The slurry is preferably comprised of varying amounts of Portland cement, gypsum, aggregate, water, accelerators, plasticizers, foaming agents, fillers and/or other ingredients, and described above and in the patents listed above which have been incorporated by reference for producing SCP panels. The relative amounts of these ingredients, including the elimination of some of the above or the addition of others, may vary to suit the use.

While various configurations of slurry feeders 344 are contemplated which evenly deposit a thin layer of slurry 346 upon the moving carrier 314, the preferred slurry feeder 344 includes a main metering roll 348 disposed transversely to the direction of travel of the carrier 314. A companion or back up roll 350 is disposed in close parallel, rotational relationship to the metering roll 348 to form a nip 352 there between. A pair of sidewalls 354, preferably of non-stick material such as Teflon® brand material or the like, prevents slurry 346 poured into the nip 352 from escaping out the sides of the feeder 344.

The feeder 344 deposits an even, relatively thin layer of the slurry 346 upon the moving carrier 314 or the carrier web 326. Suitable layer thicknesses range from about 0.05 inch to 0.20 inch. However, with four layers preferred in the preferred structural panel produced by the present process, and a suitable building panel being approximately 0.5 inch, an especially preferred slurry layer thickness is approximately 0.125 inch.

Figure 4:
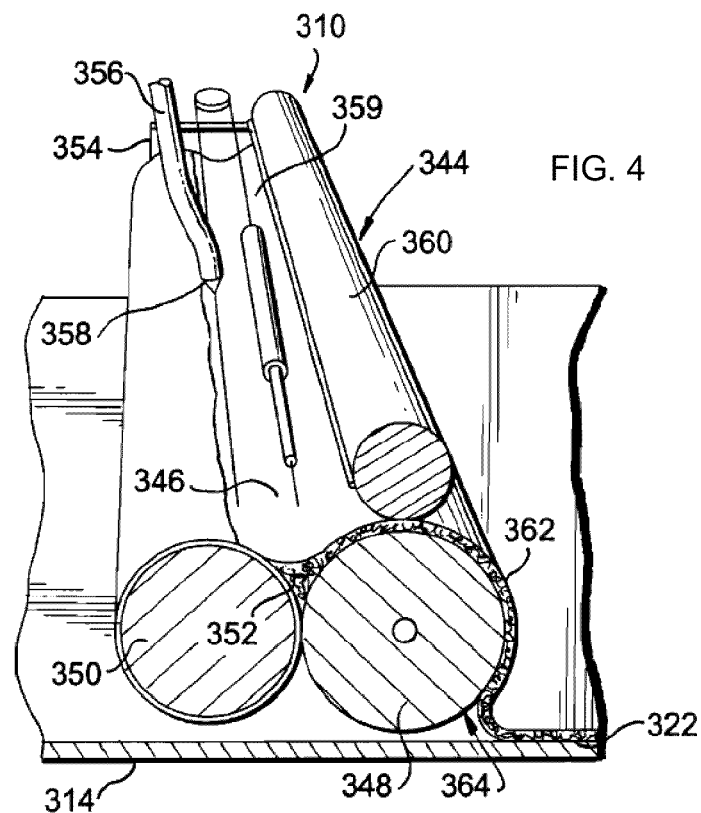
FIG. 4 is a perspective view of a slurry feed station of the type used in the process of making the SCP panel of the present invention.

Referring now to FIGS. 3 and 4, to achieve a slurry layer thickness as described above, several features are provided to the slurry feeder 344. First, to ensure a uniform disposition of the slurry 346 across the entire web 326, the slurry is delivered to the feeder 344 through a hose 356 located in a laterally reciprocating, cable driven, fluid powered dispenser 358 of the type well known in the art. Slurry flowing from the hose 356 is thus poured into the feeder 344 in a laterally reciprocating motion to fill a reservoir 359 defined by the rolls 348, 350 and the sidewalls 354. Rotation of the metering roll 348 thus draws a layer of the slurry 346 from the reservoir.

Next, a thickness monitoring or thickness control roll 360 is disposed slightly above and/or slightly downstream of a vertical centerline of the main metering roll 348 to regulate the thickness of the slurry 346 drawn from the feeder reservoir 357 upon an outer surface 362 of the main metering roll 348. Also, the thickness control roll 360 allows handling of slurries with different and constantly changing viscosities. The main metering roll 348 is driven in the same direction of travel "T" as the direction of movement of the carrier 314 and the carrier web 326, and the main metering roll 348, the backup roll 350 and the thickness monitoring roll 360 are all rotatably driven in the same direction, which minimizes the opportunities for premature setting of slurry on the respective moving outer surfaces. As the slurry 346 on the outer surface 362 moves toward the carrier web 326, a transverse stripping wire 364 located between the main metering roll 348 and the carrier web 326 ensures that the slurry 346 is completely deposited upon the carrier web and does not proceed back up toward the nip 352 and the feeder reservoir 359. The stripping wire 364 also helps keep the main metering roll 348 free of prematurely setting slurry and maintains a relatively uniform curtain of slurry.

A second chopper station or apparatus 366, preferably identical to the chopper 336, is disposed downstream of the feeder 344 to deposit a second layer of fibers 368 upon the slurry 346. In the preferred embodiment, the chopper apparatus 366 is fed cords 334 from the same rack 331 that feeds the chopper 336. However, it is contemplated that separate racks 331 could be supplied to each individual chopper, depending on the application.

Figure 5:
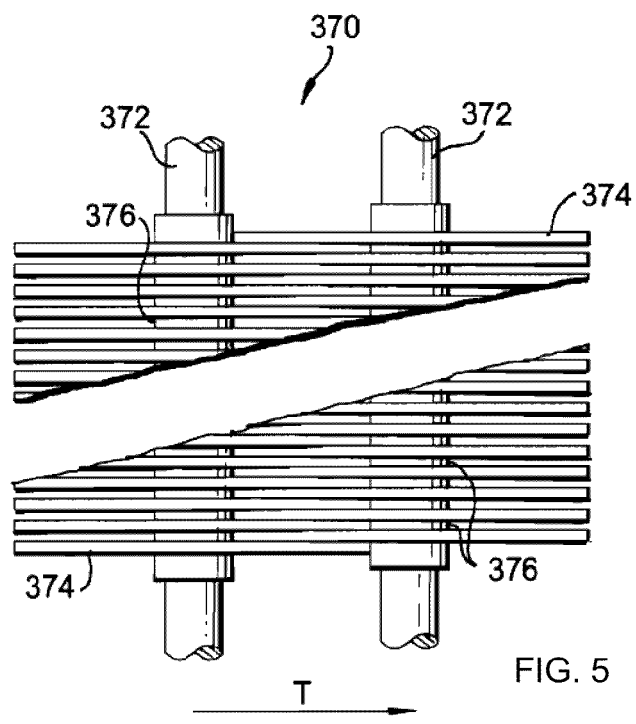
FIG. 5 is a fragmentary overhead plan view of an embedment device suitable for use with the process for making the SCP panel of the present invention.

Referring now to FIGS. 3 and 5, next, an embedment device, generally designated 370 is disposed in operational relationship to the slurry 346 and the moving carrier 314 of the production line 310 to embed the fibers 368 into the slurry 346. While a variety of embedment devices are contemplated, including, but not limited to vibrators, sheep's foot rollers and the like, in the preferred embodiment, the embedment device 370 includes at least a pair of generally parallel shafts 372 mounted transversely to the direction of travel "T" of the carrier web 326 on the frame 312. Each shaft 372 is provided with a plurality of relatively large diameter disks 374 which are axially separated from each other on the shaft by small diameter disks 376.

During SCP panel production, the shafts 372 and the disks 374, 376 rotate together about the longitudinal axis of the shaft. As is well known in the art, either one or both of the shafts 372 may be powered, and if only one is powered, the other may be driven by belts, chains, gear drives or other known power transmission technologies to maintain a corresponding direction and speed to the driving roll. The respective disks 374, 376 of the adjacent, preferably parallel shafts 372 are intermeshed with each other for creating a "kneading" or "massaging" action in the slurry, which embeds the fibers 368 previously deposited thereon. In addition, the close, intermeshed and rotating relationship of the disks 372, 374 prevents the buildup of slurry 346 on the disks, and in effect creates a "self-cleaning" action which significantly reduces production line downtime due to premature setting of clumps of slurry.

The intermeshed relationship of the disks 374, 376 on the shafts 372 includes a closely adjacent disposition of opposing peripheries of the small diameter spacer disks 376 and the relatively large diameter main disks 374, which also facilitates the self-cleaning action. As the disks 374, 376 rotate relative to each other in close proximity (but preferably in the same direction), it is difficult for particles of slurry to become caught in the apparatus and prematurely set. By providing two sets of disks 374 which are laterally offset relative to each other, the slurry 346 is subjected to multiple acts of disruption, creating a "kneading" action which further embeds the fibers 368 in the slurry 346.

Once the fibers 368 have been embedded, or in other words, as the moving carrier web 326 passes the embedment device 370, a first layer 377 of the SCP panel is complete. In the preferred embodiment, the height or thickness of the first layer 377 is in the approximate range of 0.05-0.20 inches. This range has been found to provide the desired strength and rigidity when combined with like layers in a SCP panel. However, other thicknesses are contemplated depending on the application.

To build a structural cementitious panel of desired thickness, additional layers are needed. To that end, a second slurry feeder 378, which is substantially identical to the feeder 344, is provided in operational relationship to the moving carrier 314, and is disposed for deposition of an additional layer 380 of the slurry 346 upon the existing layer 377.

Next, an additional chopper 382, substantially identical to the choppers 336 and 366, is provided in operational relationship to the frame 312 to deposit a third layer of fibers 384 provided from a rack (not shown) constructed and disposed relative to the frame 312 in similar fashion to the rack 331. The fibers 384 are deposited upon the slurry layer 380 and are embedded using a second embedment device 386. Similar in construction and arrangement to the embedment device 370, the second embedment device 386 is mounted slightly higher relative to the moving carrier web 314 so that the first layer 377 is not disturbed. In this manner, the second layer 380 of slurry and embedded fibers is created.

Referring now to FIG. 3, with each successive layer of settable slurry and fibers, an additional slurry feeder station 378, 402 followed by a fiber chopper 382, 404 and an embedment device 386, 406 is provided on the production line 310. In the preferred embodiment, four total layers (see for example, the panel 21 of FIG. 2) are provided to form the SCP panel. Upon the disposition of the four layers of fiber-embedded settable slurry as described above, a forming device 394 is preferably provided to the frame 312 to shape an upper surface 396 of the panel. Such forming devices 394 are known in the settable slurry/board production art, and typically are spring-loaded or vibrating plates which conform the height and shape of the multi-layered panel to suit the desired dimensional characteristics.

The panel made has multiple layers (see for example layers 22, 24, 26, 28 of panel 21 of FIG. 2) which upon setting form an integral, fiber-reinforced mass. Provided the presence and placement of fibers in each layer are controlled by and maintained within certain desired parameters as is disclosed and described below, it will be virtually impossible to delaminate the panel.

At this point, the layers of slurry have begun to set, and the respective panels are separated from each other by a cutting device 398, which in the preferred embodiment is a water jet cutter. Other cutting devices, including moving blades, are considered suitable for this operation, provided that they can create suitably sharp edges in the present panel composition. The cutting device 398 is disposed relative to the line 310 and the frame 312 so that panels are produced having a desired length, which may be different from the representation shown in FIG. 3. Since the speed of the carrier web 314 is relatively slow, the cutting device 398 may be mounted to cut perpendicularly to the direction of travel of the web 314. With faster production speeds, such cutting devices are known to be mounted to the production line 310 on an angle to the direction of web travel. Upon cutting, the separated panels 321 are stacked for further handling, packaging, storage and/or shipment as is well known in the art.

The number of fiber and slurry layers, the volume fraction of fibers in the panel, and the thickness of each slurry layer, and fiber strand diameter influences fiber embedment efficiency. The following parameters were identified:

$v_T$=Total composite volume
$v_s$=Total panel slurry volume
$V_f$=Total panel fiber volume
$V_{f,l}$=Total fiber volume/layer
$v_{T,l}$=Total composite volume/layer
$v_{s,l}$=Total slurry volume/layer
$N_l$=Total number of slurry layers; Total number of fiber layers
$V_f$=Total panel fiber volume fraction
$d_f$=Equivalent diameter of individual fiber strand
$l_f$=Length of individual fiber strand
t=Panel thickness
$t_l$=Total thickness of individual layer including slurry and fibers
$t_{s,l}$=Thickness of individual slurry layer
$n_{f,l}, n_{f1,l}, n_{f2,l}$=Total number of fibers in a fiber layer
$S_{f,l}^P, S_{f1,l}^P, S_{f2,l}^P$=Total projected surface area of fibers contained in a fiber layer
$S_{f,l}^P, S_{f1,l}^P, S_{f2,l}^P$=Projected fiber surface area fraction for a fiber layer.

Assume a panel composed of equal number of slurry and fiber layers. The projected fiber surface area fraction, $S_{f,l}^P$ of a layer of fiber network being deposited over a distinct slurry layer is given by the following mathematical relationship:

$$S_{f,l}^P = \frac{4V_f t}{\pi N_l d_f} = \frac{4V_f * t_{s,l}}{\pi d_f (1 - V_f)}$$

where, $V_f$ is the total panel fiber volume fraction, t is the total panel thickness, $d_f$ is the diameter of the fiber strand, $N_l$ is the total number of fiber layers and $t_{s,l}$ is the thickness of the distinct slurry layer being used.

Accordingly, to achieve good fiber embedment efficiency, the objective function becomes keeping the fiber surface area fraction below a certain critical value. By varying one or more variables appearing in the equations, the projected fiber surface area fraction can be tailored to achieve good fiber embedment efficiency.

Different variables that affect the magnitude of projected fiber surface area fraction are identified and approaches have been suggested to tailor the magnitude of "projected fiber surface area fraction" to achieve good fiber embedment efficiency. These approaches involve varying one or more of the following variables to keep projected fiber surface area fraction below a critical threshold value: number of distinct fiber and slurry layers, thickness of distinct slurry layers and diameter of fiber strand.

The preferred magnitudes of the projected fiber surface area fraction, $S_{f,l}^P$ have been discovered to be as follows:
Preferred projected fiber surface area fraction, $S_{f,l}^P$ <0.65
Most preferred projected fiber surface area fraction, $S_{f,l}^P$ <0.45

For a design panel fiber volume fraction, $V_f$, achievement of the aforementioned preferred magnitudes of projected fiber surface area fraction can be made possible by tailoring one or more of the following variables—total number of distinct fiber layers, thickness of distinct slurry layers and fiber strand diameter. In particular, the desirable ranges for these variables that lead to the preferred magnitudes of projected fiber surface area fraction are as follows:

Thickness of Distinct Slurry Layers in Multiple Layer SCP panels, $t_{s,l}$
Preferred thickness of distinct slurry layers, $t_{s,l}$ ≦0.30 inches
More Preferred thickness of distinct slurry layers, $t_{s,l}$ ≦0.20 inches
Most preferred thickness of distinct slurry layers, $t_{s,l}$ ≦0.08 inches
Number of Distinct Fiber Layers in Multiple Layer SCP panels, $N_l$
Preferred number of distinct fiber layers, $N_l$ ≧4
Most preferred number of distinct fiber layers, $N_l$ ≧6
Fiber Strand Diameter, $d_f$
Preferred fiber strand diameter, $d_f$≧30 tex
Most preferred fiber strand diameter, $d_f$≧70 tex Properties The SCP panel metal frame system of the present invention preferably has one or more of the properties listed in TABLES 2A-2F. The properties are for panels with thicknesses greater than ½ inch (12.7 mm) for applications shown in the TABLES.

TABLE 2A

CONCENTRATED LOAD PERFORMANCE PER ASTM E 661

| Physical Characteristics | Unit | Required Value | Typical Values/ Range | Notes |
|---|---|---|---|---|
| Subfloor | | | | |
| Minimum static concentrated load. For span ratings of 16", 20" or 24" o.c. | kg (lbf) | Before impact: 182 (400) After impact: 182 (400) | Before impact: 182-318 (400-700) After impact: 182-318 (400-700) | Impact conducted per Section 7.5 of ASTM E 661 using a 75 ft-lbf impact. Maximum deflection criterion After applies to static concentrated load before and after impact. Minimum load and maximum deflection criteria apply to dry and wet test conditions. Wet test consists of a 7-day continuous soak followed by testing while wet. |
| Maximum deflection under 91-kg (200-lb) load. For span ratings of 16", 20" or 24" o.c. | mm (in) | 3.2 (0.125) | <3.2 (0.125) | |
| Single Floor | | | | |
| Minimum static concentrated load For span ratings of 16", 20" or 24" o.c. | kg (lbf) | Before impact: 250 (550) After impact: 182 (400) | Before impact: 250-455 (550-1000) After impact: 182-318 (400-700) | Impact conducted per Section 7.5 of ASTM E 661 using a 75 ft-lbf impact. Maximum deflection criteria apply to static concentrated load before and after impact. Minimum load and maximum deflection criteria apply to dry and wet test conditions. Wet test consists of a 7-day continuous soak followed by testing while wet. |
| Maximum deflection under 91-kg (200-lb) load At 16" o.c. span rating At 20" o.c. span rating At 24" o.c. span rating | mm (in) | 2.0 (0.078) 2.4 (0.094) 2.7 (0.108) | <2.0 (0.078) <2.4 (0.094) <2.7 (0.108) | |
| Roof Sheathing | | | | |
| Minimum static concentrated load For span ratings of 16", 20", 24" or 32" o.c. | kg (lbf) | Before impact: 182 (400) After impact: 136 (300) | Before impact: 182-318 (400-700) After impact: 136-227 (300-500) | Impact conducted per Section 7.5 of ASTM E 661 using a 75 ft-lbf impact for span ratings up to 24" o.c. and 90 ft-lbf impact for span ratings of 32" o.c. Maximum deflection criteria apply to static concentrated load before and after impact. Minimum load and maximum deflection criteria apply to dry and wet test conditions. Wet test consists of a 7-day continuous soak followed by testing while wet. |

TABLE 2B

UNIFORM LOAD PERFORMANCE PER ASTM E 330

| Physical Characteristics | Unit | Required Value | Typical Values/ Range | Notes |
|---|---|---|---|---|
| Floor Sheathing | | | | |
| Minimum ultimate uniform load For span ratings of 16", 20" or 24" o.c. | kPa (psf) | 15.8 (330) | >15.8 (330) | Minimum load and maximum deflection criteria apply to dry and wet test conditions. Wet test consists of a 7-day continuous soak followed by testing while wet. Maximum deflection criteria correspond to a deflection of (span/360) |
| Maximum deflection at 4.8 kPa (100 psf) At 16" o.c. span rating 20" 24" | mm (in) | 1.1 (0.044) 1.3 (0.053) 1.7 (0.067) | <1.1 (0.044) <1.3 (0.053) <1.7 (0.067) | |

TABLE 2B-continued

UNIFORM LOAD PERFORMANCE PER ASTM E 330

| Physical Characteristics | Unit | Required Value | Typical Values/Range | Notes |
|---|---|---|---|---|
| Roof Sheathing | | | | |
| Minimum ultimate uniform load For span ratings of 16", 20", 24" or 32" o.c. | kPa (psf) | 7.2 (150) | >7.2 (150) | Minimum load and maximum deflection criteria apply to dry and wet test conditions. Wet test consists of a 7-day continuous soak followed by testing while wet. Maximum deflection criteria correspond to a deflection of (span/240) |
| Maximum deflection at 1.7 kPa (35 psf) At 16" o.c. span rating 20" 24" 32" | mm (in) | 1.7 (0.067) 2.0 (0.080) 2.5 (0.100) 3.4 (0.133) | <1.7 (0.067) <2.0 (0.080) <2.5 (0.100) <3.4 (0.133) | |

TABLE 2C

MECHANICAL PERFORMANCE

| Physical Characteristics | Test Method | Unit | Minimum Value | Typical Values/Range | Notes |
|---|---|---|---|---|---|
| Floor Sheathing | | | | | |
| Dry Moment Capacity For span ratings of 16", 20" or 24" o.c. | ASTM C 1704 | N-m/m (lb-in/ft) | 537 (1450) | 667-927 (1800-2500) | Criteria for minimum dry and wet moment capacity and minimum dry bending stiffness apply to specimens with stress applied parallel and perpendicular to its long dimension. The wet test consists of a 48-hr soak followed by testing while wet. |
| Wet Moment Capacity For span ratings of 16", 20" or 24" o.c. | ASTM C 1704 | N-m/m (lb-in/ft) | 376 (1015) | 482-667 (1300-1800) | |
| Dry Bending Stiffness For span ratings of 16", 20" or 24" o.c. | ASTM C 1704 | N-m²/m lb-in²/ft | 2100 (223000) | 3295-5178 (350000-550000) | |
| Roof Sheathing | | | | | |
| Dry Moment Capacity For span ratings of 16", 20" or 24" o.c. For span rating of 32" o.c. | ASTM C 1704 | N-m/m (lb-in/ft) | 373 (1007) 537 (1450) | For <24": 463-630 (1250-1700) For 32": 667-927 (1800-2500) | Criteria for minimum dry and wet moment capacity and minimum dry bending stiffness apply to specimens with stress applied parallel and perpendicular to long dimensions. The wet test consists of a 48-hr soak followed by testing while wet. |
| Wet Moment Capacity For span ratings of 16", 20" or 24" o.c. For span rating of 32" o.c. | ASTM C 1704 | N-m/m (lb-in/ft) | 261 (705) 376 (1015) | For <24" 334-463 (900-1250) For 32": 482-667 (1300-1800) | |
| Dry Bending Stiffness For span ratings of 16", 20" or 24" o.c. For span rating of 32" o.c. | ASTM C 1704 | N-m²/m(lb-in/ft) | 1215 (129051) 2100 (223000) | For <24": 1930-2966 (205000-315000) For 32": 3295-5178 (350000-550000) | |

TABLE 2D

FASTENER PERFORMANCE

| Physical Characteristics | Test Method | Unit | Minimum Value | Typical Values/Range | Notes |
|---|---|---|---|---|---|
| Lateral load resistance Dry Wet | APA PS2-04, Section 7.4 | kg(lbf) | 96 (210) 73 (160) | 159-227 (350-500) 91-159 (200-350) | Lateral loads are to be determined in machine and cross machine directions. The wet test consists of a 7-day continuous soak followed by testing while wet. |
| Pull-through resistance Dry Wet | ASTM D1037, Sections 54-60 | kg (lbf) | 91 (200) 68 (150) | 227-45 (500-1000) 170-341 (375-750) | |

TABLE 2E

DURABILITY PERFORMANCE

| Physical Characteristics | Test Method | Unit | Required Value | Typical Values/ Range | Notes |
|---|---|---|---|---|---|
| Linear expansion | ASTM C 1185 | % | 0.1 max. | <0.1 | |
| Thickness swell | ASTM D 1037, method B | % | 3 max. | <1 | |
| Water absorption | ASTM C 1704 | % | 15 max. | 4-12 | |
| Freeze/thaw | ASTM C 1185 | % | 75 min. | >90 | Performance criteria is based on percent strength retention following 50 freeze-thaw cycles |
| Long term | ASTM C 1185 | % | 75 min. | 80-120 | Performance criteria is based durability on percent strength retention following 56-day soak in water at 140° F. |
| Water durability | ASTM C 1185 | % | 70 min. | 70-85 | Performance criteria is based on percent strength retention following 48-hr soak in room temperature water |
| Mold | ASTM D 3273 | — | 10 min. | 10 | |

TABLE 2F

FIRE PERFORMANCE

| Physical Characteristics | Test Method | Unit | Target Value | Typical Values/ Range | Notes |
|---|---|---|---|---|---|
| Non-combustibility | ASTM E 136 | Temp rise | <30° C. (54° F.) | <30° C. (54° F.) | Performance criteria is based on temperature rise of the surface and interior of test specimens |
| | | Weight loss | <50% | <50% | |
| | | Flaming? | No flaming | No flaming | |
| Surface burning | ASTM E 84 | Flame spread | 0 | 0 | |
| | | Smoke developed | <5 | <5 | |

The panels of the present invention typically have a nominal racking shear strength (shear strength) of at least 200 lbs per lineal foot, preferably 720 lbs per lineal foot (1072 kg per lineal meter). A system having 3/8-3/4 inch (9-19 mm), e.g. 1/2 inch (12.5 mm), thick SCP panels mechanically and/or adhesively laterally braced metal framing when tested according to ASTM E-72 typically has a nominal wall shear capacity (also known as nominal racking shear strength) of 200 to 1200, or 400 to 1200, or 800 to 1200 pounds per linear foot. The shear panels of the present invention typically have a nominal racking shear strength (shear strength) of 720 lbs/ft (1072 kg/m) before failure occurs. For example, when used for walls, the nominal racking shear strength of a 0.5 inch (12.7 mm) thick panel measured by the ASTM E72 test using the appropriate metal studs, fasteners, stud spacing and fastener spacing typically is at least 720 lbs per lineal foot (1072 kg per lineal meter).

The nominal racking shear strength is measured to determine the load which the panel can resist within the allowed deflection without failure. The shear rating is generally based on testing of three identical 8×8 ft (2.44×2.44 m) assemblies, i.e., panels fastened to framing. One edge is fixed in place while a lateral force is applied to a free end of the assembly until the load is no longer carried and the assembly fails. The measured shear strength will vary, depending upon the thickness of the panel and the size and spacing of the nails used in the assembly. For example, a typical assembly, e.g., a nominal 1/2 inch (12.7 mm) thick plywood fastened with 8d nails (see the nail description below) to nominal 2×4 inch (50.8×101.6 mm) wood studs spaced 16 inches (406.4 mm) apart (on centers), the nails being spaced 6 inches (152.4 mm) apart on the perimeter and 12 inches (304.8 mm) apart within the perimeter, would be expected to show a shear strength of 720 lbs/ft (1072 kg/m) before failure occurs. (Note the measured strength will vary as the nail size and spacing is changed, as the ASTM E72 test provides.) This ultimate strength will be reduced by a safety factor, e.g., a factor of three, to set the design shear strength for the panel.

EXAMPLES

The following examples illustrate the performance and benefits of using the fine coated expanded perlite as partial or full replacement of hollow ceramic microsphere in a typical formulation for SCP panels. All mixtures comprise, on a dry basis, a cement binder of reactive powder consisting of calcium sulfate alpha hemihydrate, Portland cement, silica fume and lime proportioned at 65, 22, 12 and 1% respectively by weight of total cement binder. In prior SCP formulations, containing only ceramic microspheres, the hollow microsphere filler to binder ratio is typically 0.44:1.00 by weight.

In the formulation of the present invention with fine coated expanded perlite and optional ceramic microspheres, the perlite to ceramic microsphere to binder ratio is 0.053:0.20:1.00 by weight. In the preferred formulation of the invention which use only the fine coated expanded perlite filler, the perlite to binder ratio is within the range of about 0.07 to 0.15:1.00 by weight. Examples are provided to illustrate the performance and benefits incurred by using the fine expanded perlite as partial or full replacement of hollow ceramic microsphere in prior SCP formulation. The perlite is SIL-CELL 35-23 perlite particles from Silbrico Corporation of Hodgkins, Ill. 60525, which is coated with alky alkoxy silane compound. All mixtures described here and used in the following Examples comprise a cement binder of reactive powders on a dry basis, of calcium sulfate alpha hemihydrate, Portland cement, silica fume and lime proportioned at 65, 22, 12 and 1% respectively by weight of total cement binder.

In contrast to prior SCP formulations in which water was used at a weight ratio of 0.57:1.00 relative to the cement binder, the weight ratio of water to the reactive powder cement binder in the present invention is 0.47:1.00 for the perlite and ceramic microsphere formulation and 0.44:1.00 for the preferred formulation in which the coated expanded fine perlite is used and there is no ceramic microsphere filler. Chemical admixtures such as superplasticizer (polycarboxylate ether) for control of water demand and tartaric acid for set control were varied according to the objectives of a particular experiment.

The examples illustrate how perlite formulations behave on a number of performance requirements and how they can be made similar or better to the original formulation using ceramic microspheres for certain properties. The experimental procedures relevant to each example are briefly described with the example. Wherever the term "perlite" is used, it refers to an expanded perlite with particle size range of 1 to 150 μm and a median particle size in the range of about 20 to 60 μm e.g. 40 μm that is treated with a silane coating. The abbreviation "MS" is used to describe ceramic microspheres.

Example 1

This example shows the slurry properties of mixes containing different amounts of perlite as filler in comparison to the original mix employing ceramic microspheres (MS). Typical slurry properties of interest are slump, slurry density, set time and compressive strength at different ages (7, 14 and 28 days). All mix ingredients were pre-conditioned in sealed plastic bags to laboratory conditions at 75-80° F. for at least 24 hours prior to mixing, followed by their mixing using a Hobart mixer at medium speed to achieve uniform dispersion. Dry powders which include cement binder and fillers were proportioned at the amounts shown above under the heading Examples. Superplasticizer was added at a dosage of 0.41% by weight of cement binder for the MS mixes, 0.47% for the partial perlite mixes and 0.53-0.56% for the full perlite mixes. Tartaric acid was added at varying dosages depending on the particular experiment.

Slump was measured by filling a 4" (10.2 cm) tall×2" (5.1 cm) diameter brass cylinder with the mixture in question, screeding the top edge of the cylinder to remove excess material, vertically lifting the cylinder within 5 seconds to allow the slurry to spread out and measuring the diameter of the formed slurry patty. Slurry density was measured by filling a 6" (15.2 cm) tall×3" (7.6 cm) diameter plastic cylinder with the mixture, screeding the top edge of the cylinder to remove excess material and weighing the amount of material in the cylinder. Knowing the volume of the cylinder, the density of the slurry was then calculated. Initial and final set times were determined using Gillmore needles per ASTM C 266, while compressive strength was determined on 2" (5.1 cm) cubes as per ASTM C 109.

Figure 6:
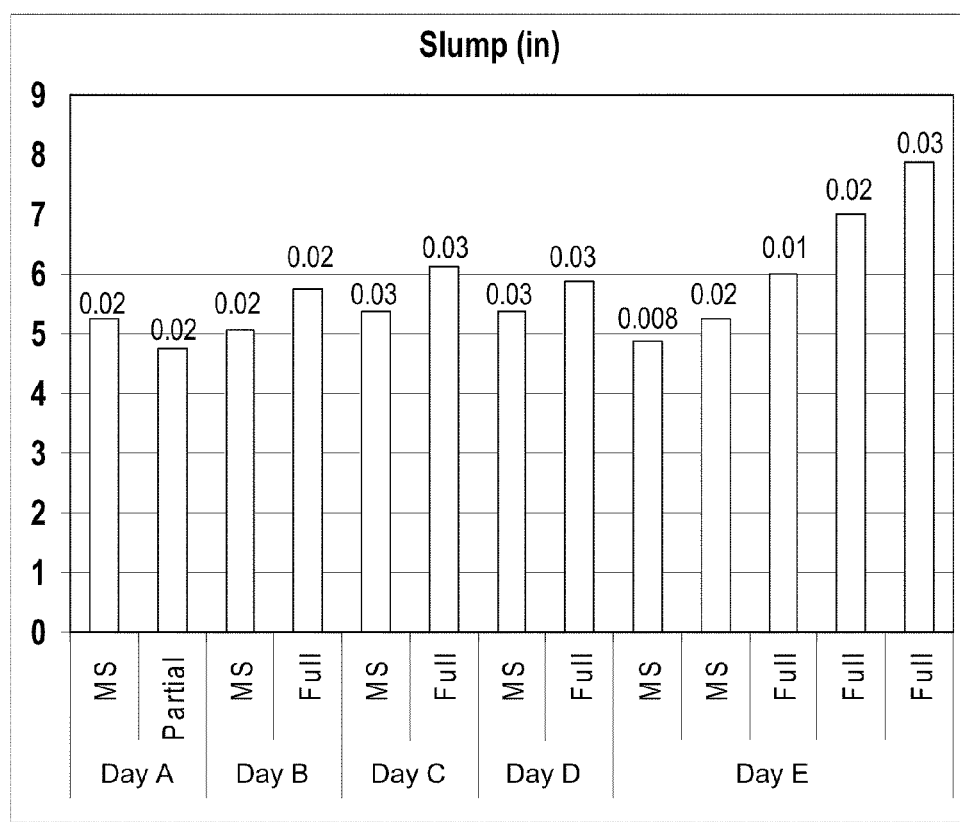
FIG. 6 is a bar graph of the slump of formulations prepared using ceramic microspheres compared to partial and full replacement of microspheres with the expanded perlite of the invention.

The slump of the mixes described in this example for the various cast dates is shown in FIG. 6. In particular, FIG. 6 shows Slump of formulations prepared using ceramic microspheres, partial perlite and full perlite (MS=microsphere, Partial=partial perlite, Full=full perlite). Tartaric acid dosage as percent by weight of cement binders is shown by values above bars.

The first two bars compare the slump of mixes with ceramic microspheres (MS) and partial perlite (Part).

The rest of the bars compare the slump of mixes with ceramic microspheres (MS) and full perlite (Full) for each of the different cast dates. Overall, it is seen the perlite formulations can be made to the same degree of initial fluidity and workability as the formulations with MS without requiring excessive adjustments to the amount of chemical admixtures (the changes in fluidity with time will be covered in Example 2). Through the combination of cement binder proportions and admixtures described in this specification, workable mixes can be made.

Figure 7:
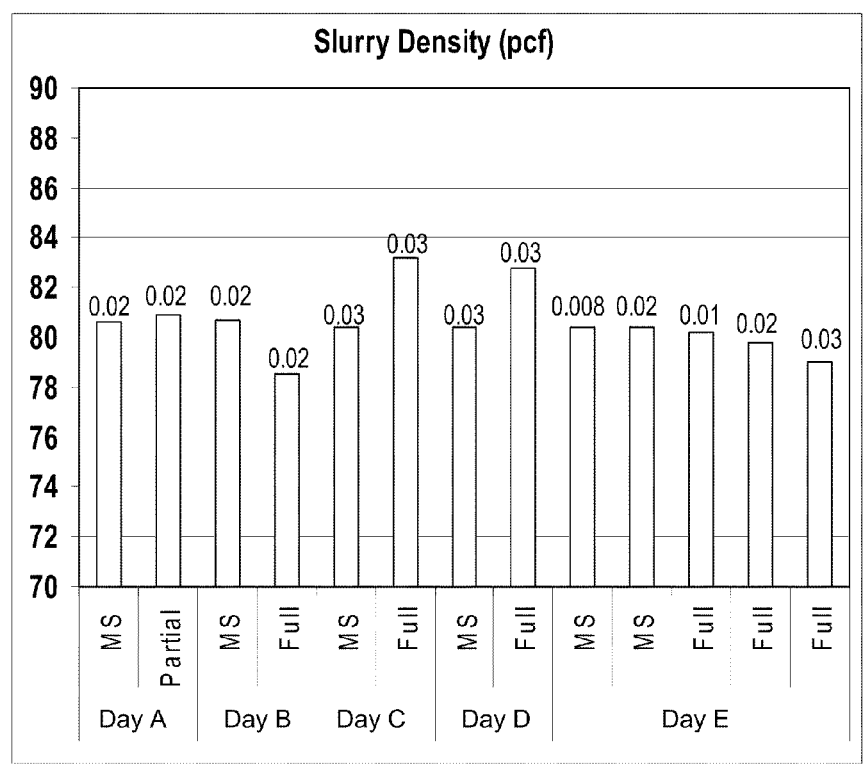
FIG. 7 is a bar graph of slurry density of formulations prepared using ceramic microspheres, and partial and full replacement of microspheres with the expanded perlite of the invention.

The density of the slurries covered in FIG. 6 is shown in FIG. 7. In particular, FIG. 7 shows slurry density of formulations prepared using ceramic microspheres, partial perlite and full perlite (MS=microsphere, Partial=partial perlite, Full=full perlite). Tartaric acid dosage as percent by weight of cement binders is shown by values above bars. It is seen that through the combination of cement binder proportions and admixtures described in this specification, mixes in the same range of density as the original mix with MS filler can be proportioned. In commercial production of SCP panels, slurries with density in the range of 78-83 pcf are normally obtained.

Figure 8:
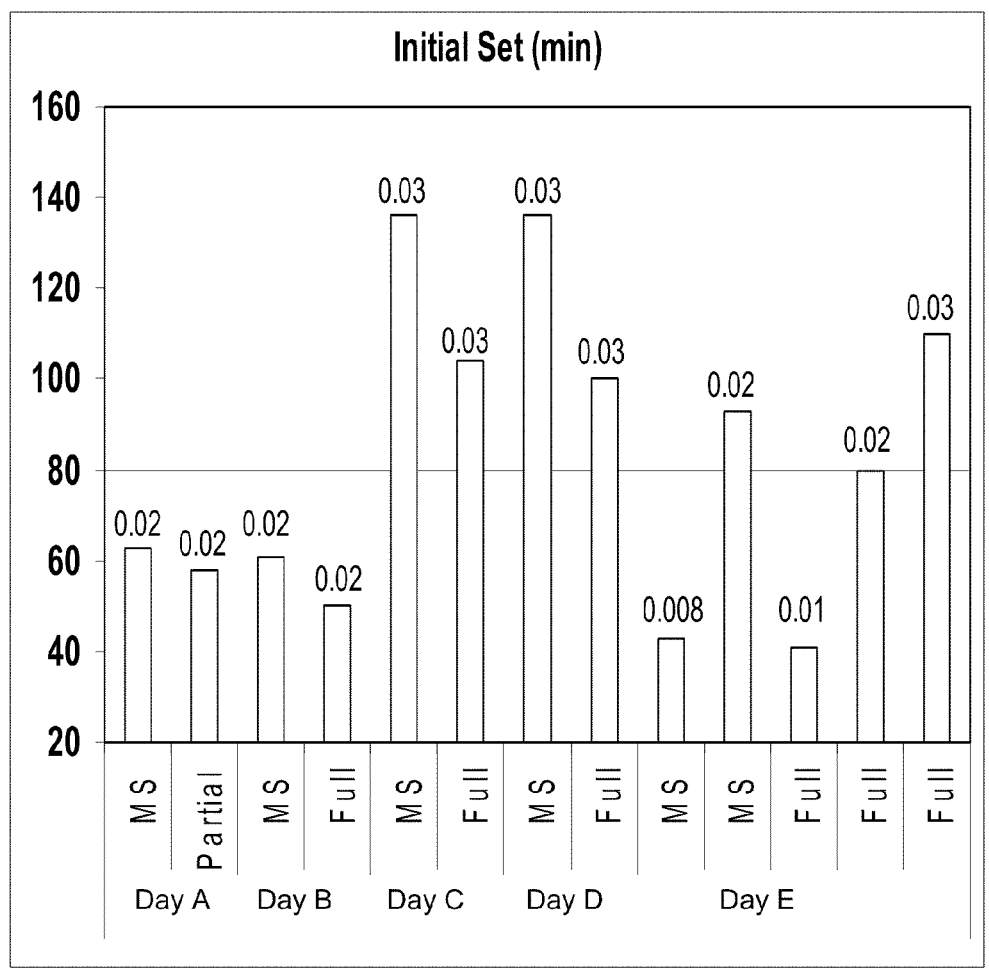
FIG. 8 is a bar graph initial set of formulations prepared using ceramic microspheres and partial and full replacement of microspheres with the expanded perlite of the invention.

Set times are usually evaluated in terms of an initial set and a final set using Gillmore needles per ASTM C 266. For comparison purposes, only the initial set is illustrated here which is shown in FIG. 8 for the mixes covered in FIGS. 6 and 7. In particular, FIG. 8 shows initial set of formulations prepared using ceramic microspheres, partial perlite and full perlite (MS=microsphere, Partial=partial perlite, Full=full perlite). Tartaric acid dosage as percent by weight of cement binders is shown by values above bars.

In general, mixes containing perlite (especially full perlite) tended to set faster compared to MS mixes when the dosage of tartaric acid by percent weight of cement binders was fixed. The actual setting behavior however can be modified by adjusting this dosage of tartaric acid.

Figure 9:
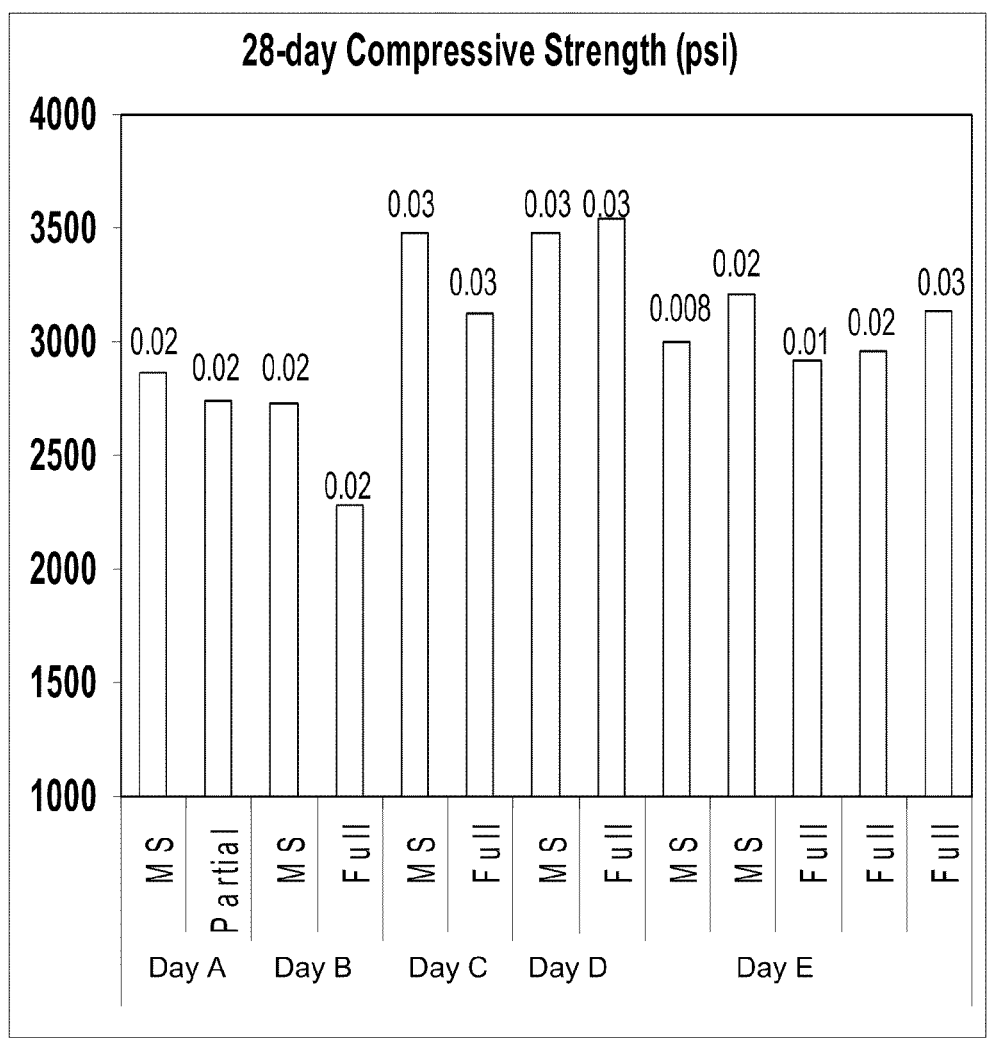
FIG. 9 is a bar graph of 28-day compressive strength of formulations prepared using ceramic microspheres and formulations with partial and full replacement of microspheres with the expanded perlite of the invention.

Compressive strength of cubes is usually evaluated at various ages after initial casting (7, 14 and 28 days). For comparison purposes, only the 28-day compressive strength is illustrated here which is shown in FIG. 9 for the mixes covered in FIGS. 6-8. In particular FIG. 9 shows 28-day compressive strength of formulations prepared using ceramic microspheres, partial perlite and full perlite (MS=microsphere, Partial=partial perlite, Full=full perlite). Days on the FIGS. 6-9 reflect the next Tartaric acid dosage as percent by weight of cement binders shown by values above bars.

For the partial perlite mix, its strength was in the same range as that of the MS mix. For the full perlite mixes, there was more variability in the test results and in several cases was higher than the corresponding control mix. The target slurry compressive strength for SCP production is 2500 psi at 28 days which is exceeded by all mixes evaluated here.

Overall, as shown in this example, the commonly measured slurry properties (slump, density, set time and compressive strength) for formulations containing the expanded coated perlite filler of the invention, as either partial or full replacement for conventional used MS filler can be adjusted to provide the same properties as the formulation conventionally used for making SCP panels. Small adjustments in the dosage of superplasticizer and tartaric acid can be made to tailor the particular perlite mix to actual production conditions.

Example 2

Slurry Slump Loss Behavior

One critical material property in the manufacture of SCP panels is the slump loss of the slurry. Normally, relatively high slurry fluidity is desired in the initial stages of the forming line where slurry is mixed and formed, while a stiff and very low fluidity (preferably already set) material is desired in the latter stages of the forming line when the SCP panel is cut and transferred to carts. Therefore, mixes with higher rates of slump loss are more desirable.

In this example, five mixes were evaluated (2 with MS and 3 with full perlite) at varying content of tartaric acid. The proportion of cement binders for these mixes was as described above and superplasticizer was added at a content of 0.45% and 0.56% by weight of cement binder for the MS and full perlite mixes respectively. Tartaric acid was added at dosages of 0.008 and 0.02% by weight of cements for the two MS mixes and at dosages of 0.01, 0.02 and 0.03% by weight of cements for the full perlite mixes. For these five mixes, slump loss and initial set were measured, and this behavior is presented in FIGS. 10a, b. In particular, FIGS. 10(a) and 10(b) show slump loss behavior of MS and full perlite mixes at varying dosages of tartaric acid (data points on abscissa represent time when initial set in slurries took place).

Figure 10:
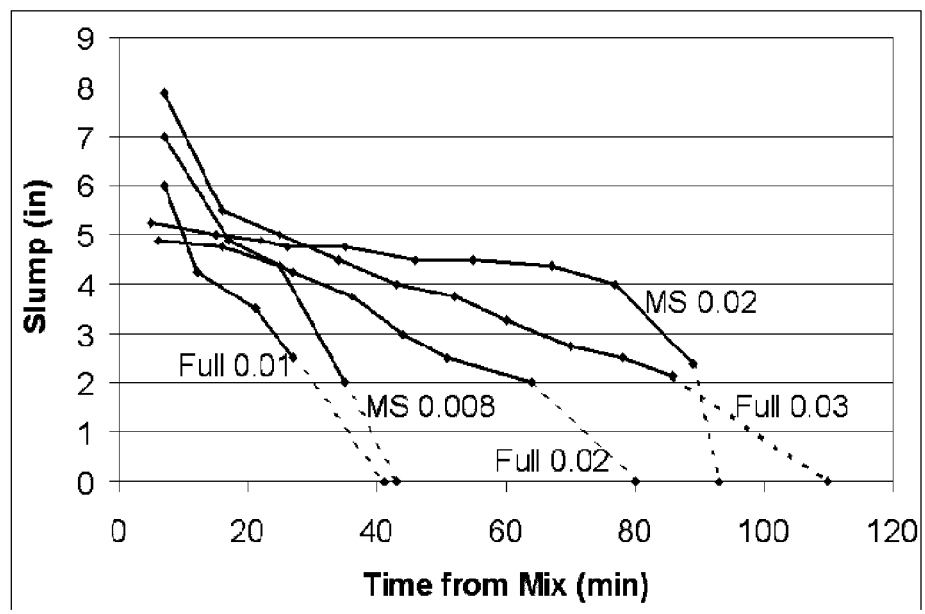
FIG. 10 is a set of bar graphs of slump versus time and slump as a percentage of initial slump value versus time for formulations containing microspheres and the expanded perlite of the invention as a full replacement for microspheres at varying dosages of tartaric acid.
Figure 10:
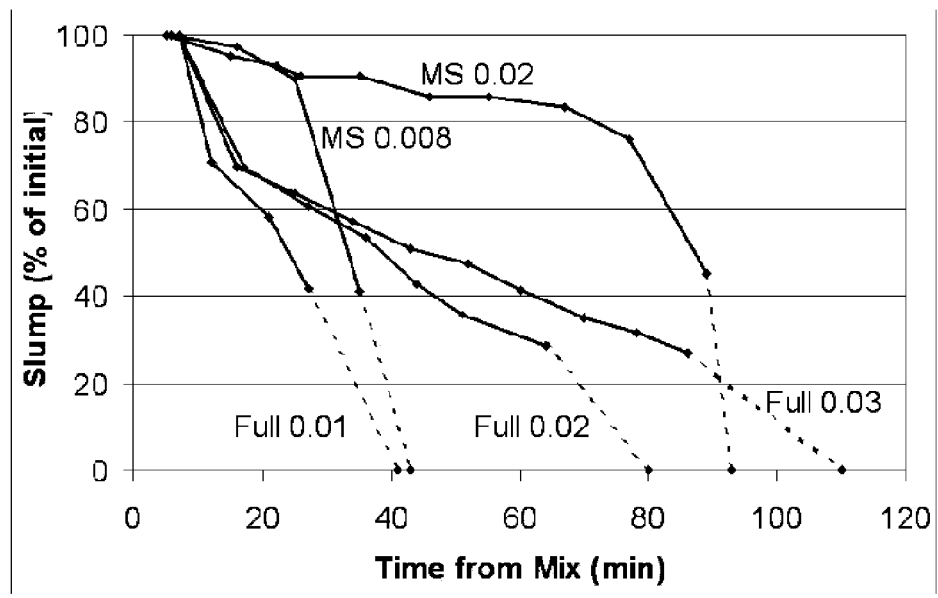

FIG. 10a shows the slump versus time behavior for each mix, while FIG. 10b shows the slump as a percentage of its initial value versus time for each mix. The specific data points on the abscissa (i.e., at slump=0) represents the time when initial set took place. It is seen here that full perlite mixes tended to set slightly sooner than MS mixes when similar dosages of tartaric acid were used. What is probably more significant is that full perlite mixes lost slump at a more rapid rate than the MS mixes, and this slump loss was almost insensitive to the amount of tartaric acid added. This higher slump loss rate is beneficial for manufacturing as described earlier as it allows for greater initial fluidity for forming and fiber embedment followed by rapid stiffening of material for back-end operations. In addition, the higher slump loss rate also implies that faster manufacturing speeds may be achievable.

Example 3

Flexural Performance of Fiber Reinforced Panels

In this example, glass fiber reinforced cement panels were made using partial and full perlite formulations for evaluation of panel flexural performance. Dry powder consisting of cement binder and filler (CM, partial perlite or full perlite) was batched according to the proportions described under "Description". Chopped AR glass fiber was added to the mix such that the resulting fiber content in the panel was 2.5% by volume. Panels were made using XY equipment which delivers slurry through a spray nozzle while also dispensing chopped glass fiber through a cutter attached to the slurry spray nozzle. The flow of slurry and rate of fiber chopping were calibrated such that the resulting fiber content in the product was at 2.5% by volume. Three-by-six feet (3'×6') (0.91 m×1.8 m) panels were produced and 6"×12" (15.2 cm×30.5 cm) specimens were saw-cut from these panels. Subsequent to cutting from panels, specimens were moist cured until their testing at either 14 or 28 days according to ASTM C 1185. Each test set consisted of 6 replicate specimens. A total of two rounds of panels were made for replication.

Figure 11A:
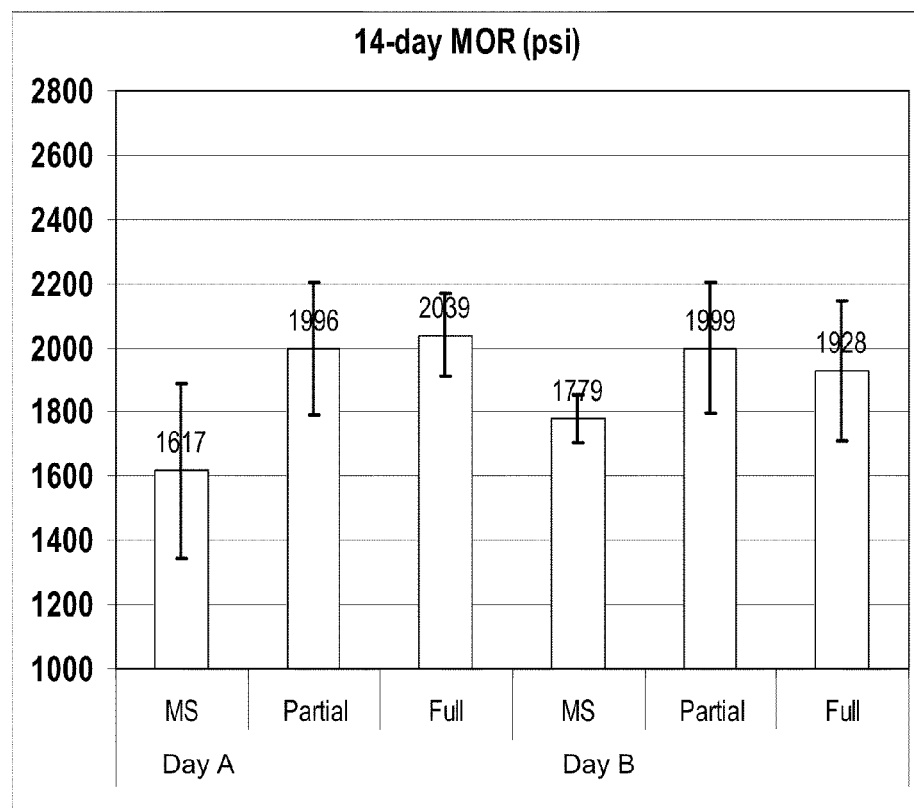
FIG. 11 is a set of bar graphs for the flexural performance at 14 days of panels made using ceramic microspheres and partial and full replacement of the ceramic microspheres with the expanded perlite of the invention.
Figure 11B:
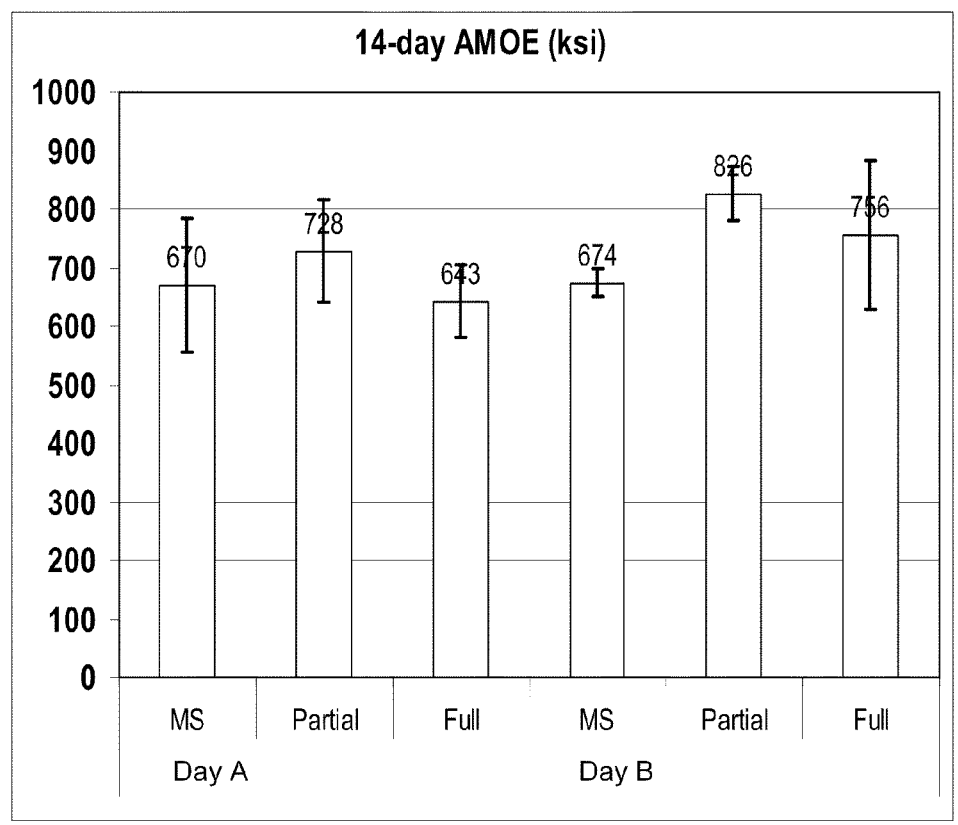

The flexural performance of structural panels is characterized through two main parameters: strength and stiffness. Due to varying thickness of produced panels, the various mixes are compared here on the basis of Modulus of Rupture (MOR) and Apparent Modulus of Elasticity (AMOE) as these parameters are normalized with respect to specimen dimension. FIG. 11(a),(b) presents the 14-day MOR and AMOE for panels made in the two rounds. In particular, FIGS. 11(a) and 11(b) show flexural performance at 14 days of panels made using ceramic microspheres, partial perlite and full perlite (MS=microsphere, Partial=partial perlite, Full=full perlite).

Figure 12A:
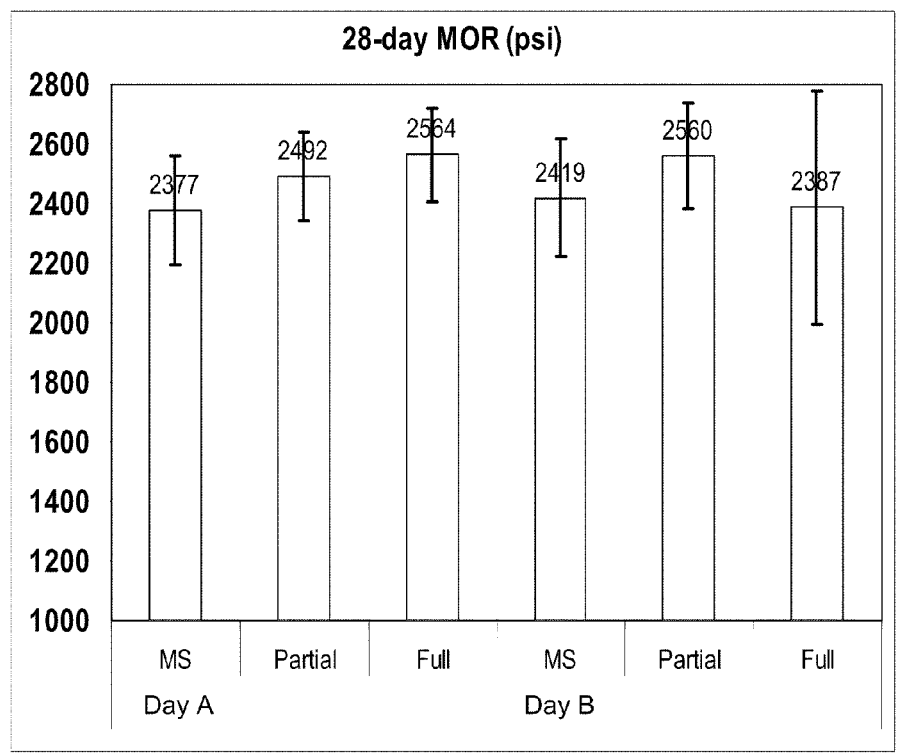
FIG. 12 is a set of bar graphs for the flexural performance at 28 days of panels made using ceramic microspheres and partial and full replacement of the ceramic microspheres with the expanded perlite of the invention.
Figure 12B:
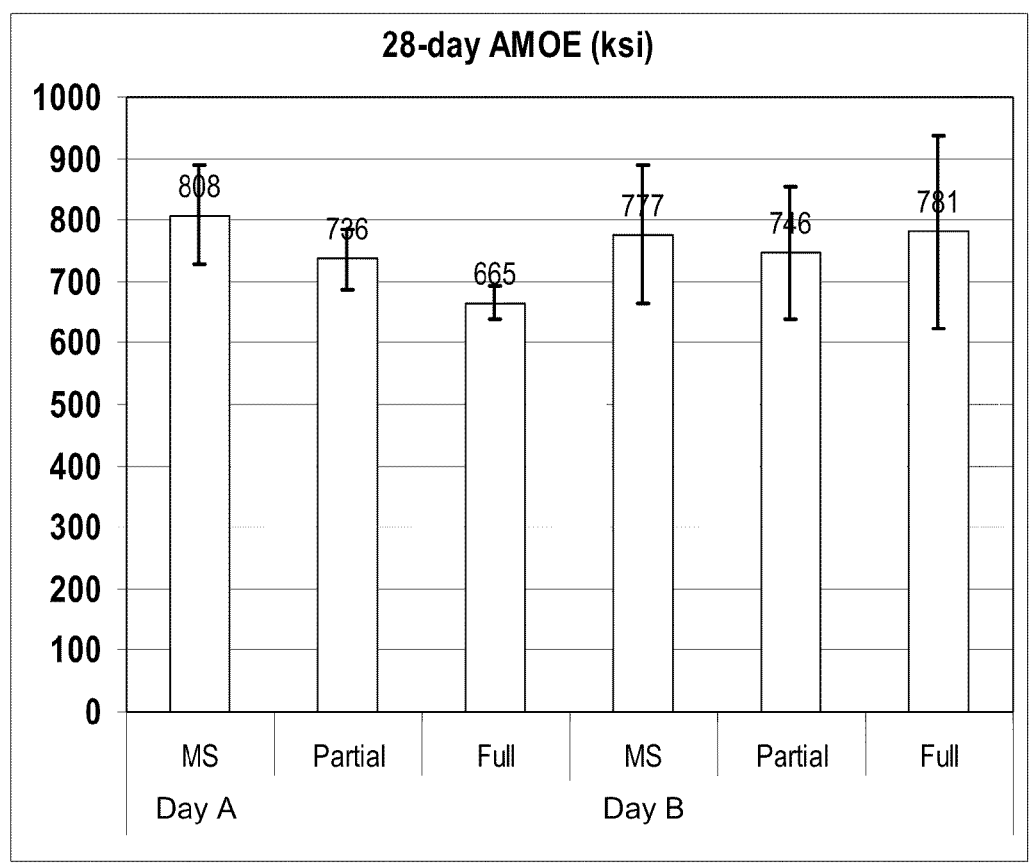

FIGS. 12(a), (b) present the 28-day MOR and AMOE for panels made in the two rounds. In particular, FIGS. 12(a) and 12(b) show flexural performance at 28 days of panels made using ceramic microspheres, partial perlite and full perlite (MS=microsphere, Partial=partial perlite, Full=full perlite). The 95% confidence range for the data set is also shown on the bars. It is seen that with perlite as partial or full replacement of MS in the mixes, similar or greater flexural strength (MOR) can be achieved in the panels. These results indicate the cement matrix and fibers were still capable of developing adequate interfacial properties and composite behavior in the presence of perlite as filler. With respect to flexural stiffness (AMOE), somewhat more variation was observed in the test data. Overall, the perlite mixes exhibited AMOE's in the same range as those in the MS mixes which indicated similar matrix stiffness for all of the tested mixes. These results demonstrate that formulations containing perlite as filler either as partial or full replacement of the MS can be proportioned to produce panels that possess similar flexural performance. For reference, the minimum specification requirement for floor sheathing applications is 1288 psi for MOR which corresponds to the minimum moment capacity of 1450 lbf-in/ft for a ¾ inch pick panel, as established in ICC-ES Acceptance Criteria AC-318 and ASTM C 1705 standard. The minimum specification requirement for AMOE is 529 ksi which correspond to a bending stiffness of 223,000 lbf-in$^2$/ft for a ¾ inch pick panel, established in ICC-ES Acceptance Criteria AC-318 and ASTM C 1705 standard. All of the tested samples exceeded these specifications.

Example 4

Wet Durability

Figure 13:
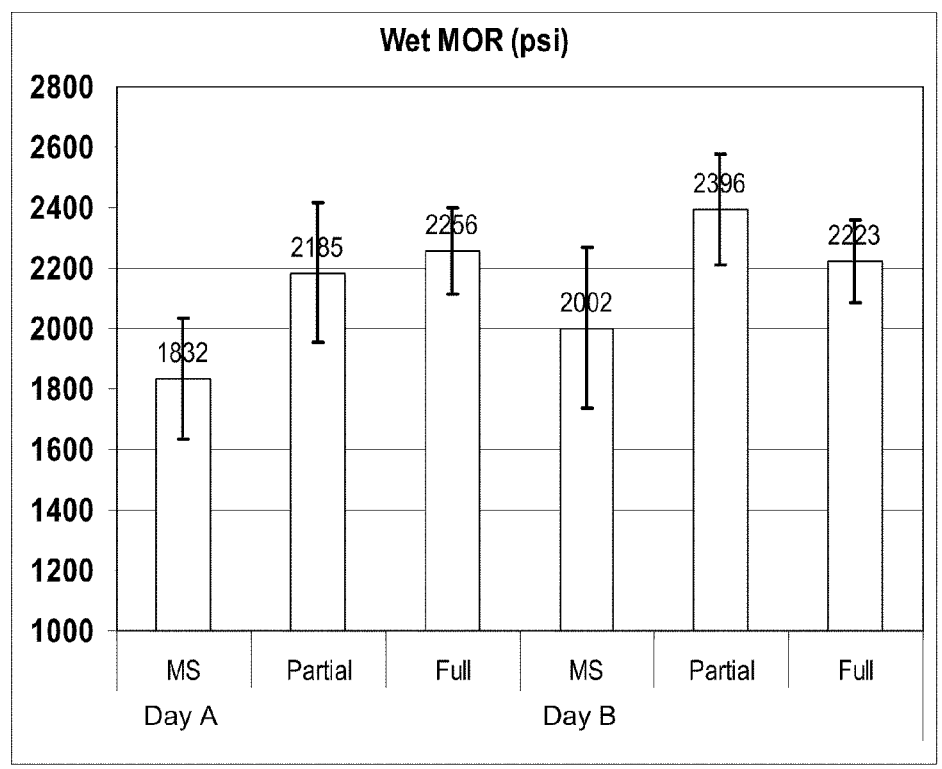
FIG. 13 is a bar graph of MOR after 48-hr soak of panels made using ceramic microspheres and partial and full replacement of the ceramic microspheres with the expanded perlite of the invention.

From the panels described in Example 3, specimens were also obtained for wet durability testing. This test involves soaking 6"×12" specimens in room temperature water for 48 hrs following 28-day cure, then testing in flexure per ASTM C 1185. The ratio of wet-to-dry flexural strength is then computed as the wet durability and typical floor sheathing panel specifications require a minimum 70% strength retention. FIG. 13 shows the wet MOR for the various mixes in the two test rounds. In particular, FIG. 13 shows MOR after 48-hr soak of panels made using ceramic microspheres, partial perlite and full perlite (MS=microsphere, Partial=partial perlite, Full=full perlite).

Here it is seen that panels with perlite consistently showed higher MOR than the control panels (an almost 10-20% difference). The wet strength retention for these panels, calculated as (Avg. Wet MOR)/(Avg. 28-day Dry MOR)×100%, for the 6 panels evaluated are shown in TABLE 4-1. This table shows with coated perlite in the formulation, panels had greater wet strength retention, which implies greater hydrophobicity in the perlite formulations. The greater strength retention is particularly advantageous for panels exposed to moist conditions such as during transportation and installation at the jobsite.

Figure 14:
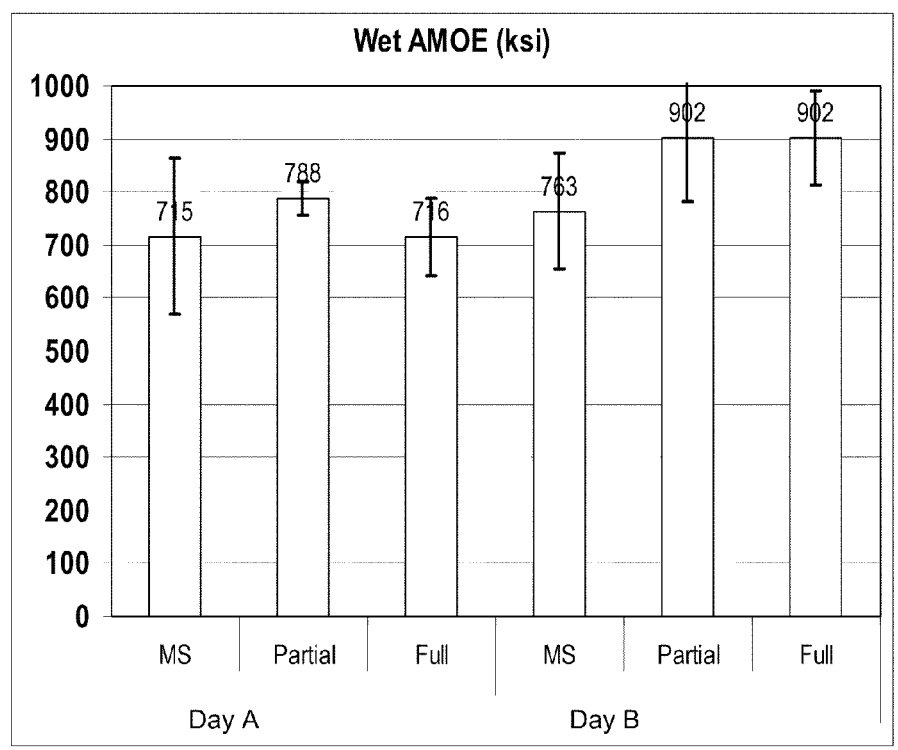
FIG. 14 is a bar graph of AMOE after 48-hr soak of panels made using ceramic microspheres and partial and full replacement of the ceramic microspheres with the expanded perlite of the invention.

FIG. 14 shows AMOE after 48-hr soak of panels made using ceramic microspheres, partial perlite and full perlite (MS=microsphere, Partial=partial perlite, Full=full perlite). Although not part of a product specification, the stiffness retention based on the wet AMOE values of FIG. 14 was also computed and shown in TABLE 4-2. It is again seen that perlite mixes had greater stiffness retention values compare to MS mixes.

TABLE 4-1

Wet flexural strength (MOR) retention of panels made using ceramic microspheres, partial perlite and full perlite.

| Panel Type | First production run | Second production run |
|---|---|---|
| MS | 77% | 83% |
| Partial perlite | 87% | 94% |
| Full perlite | 88% | 93% |

As shown in Table 4-1, the wet flexural strength retention values for the formulations of the invention are all in excess of 70%, which is the minimum specification as established in ICC-ES Acceptance Criteria AC-318 and the ASTM C 1705 standard.

TABLE 4-2

Wet flexural stiffness (AMOE) retention of panels made using ceramic microspheres, partial perlite and full perlite.

| Panel Type | First production run | Second production run |
|---|---|---|
| MS | 89% | 98% |
| Partial perlite | 107% | 121% |
| Full perlite | 108% | 115% |

Example 5

Freeze-Thaw Durability

From panels made during the first production round, specimens were also obtained for freeze-thaw testing per ASTM C 1185. This test involves first soaking the specimens (6"×12") (15.2×30.5 cm) in water at room temperature for 48 hours, sealing them, then subjecting them to 50 alternating cycles of freezing and thawing following the temperature-time regime specified in the test method, then soaking in water again for 48 hours and testing in flexure. The strength after completion of 50 freeze-thaw cycles is then compared to the strength of control specimens which were only exposed to 48-hour soak in room temperature water (Example 4). The strength and stiffness retention values were calculated and shown in TABLE 5-1. The retention values were generally excellent at approximately 100% or greater indicating no loss in performance. For strength retention, the typical commercial specification value is 75% which was well-exceeded by all mixes.

As shown in Table 5-1, the wet flexural strength retention values for the formulations of the invention are all in excess of 75%, which is above the minimum specification as established in ICC-ES Acceptance Criteria AC-318 and the ASTM C 1705 standard.

Table 5-1

Flexural strength (MOR) and stiffness (AMOE) retention following 50 freeze-thaw cycles for panels made using ceramic microspheres, partial perlite and full perlite.

| Panel Type | MOR retention | AMOE retention |
|---|---|---|
| MS | 116% | 110% |
| Partial perlite | 104% | 103% |
| Full perlite | 105% | 96% |

Example 6

Long Term Durability

Specimens were procured from panels from the first production round for long term durability testing per ASTM C 1185. This test involves soaking the specimens (6"×12") (15.2×30.5 cm) in 140° F. water for 56 days followed by their testing in flexure. The strength after completion of hot soaking is then compared to the strength of control specimens which were only exposed to 48-hour soak in room temperature water (Example 4). For the panels in question, the strength and stiffness retention values were calculated and shown in TABLE 6-1. The retention values were generally excellent with values greater than 90%. For strength retention, the typical specification value is 75% which is well-exceeded by all mixes, including the perlite formulations.

TABLE 6-1

Flexural strength (MOR) and stiffness (AMOE) retention following 56-day exposure to 140° F. water for panels made using ceramic microspheres, partial perlite and full perlite

| Panel Type | MOR retention | AMOE retention |
|---|---|---|
| MS | 119% | 108% |
| Partial perlite | 106% | 97% |
| Full perlite | 98% | 93% |

As shown in Table 6-1, the formulations of the invention at flexural strength retention values in excess of 75%, which is the minimum specification as established in ICC-ES Acceptance Criteria AC-318 and the ASTM C 1705 standard.

Example 7

Lateral Fastener Resistance

Figure 15:
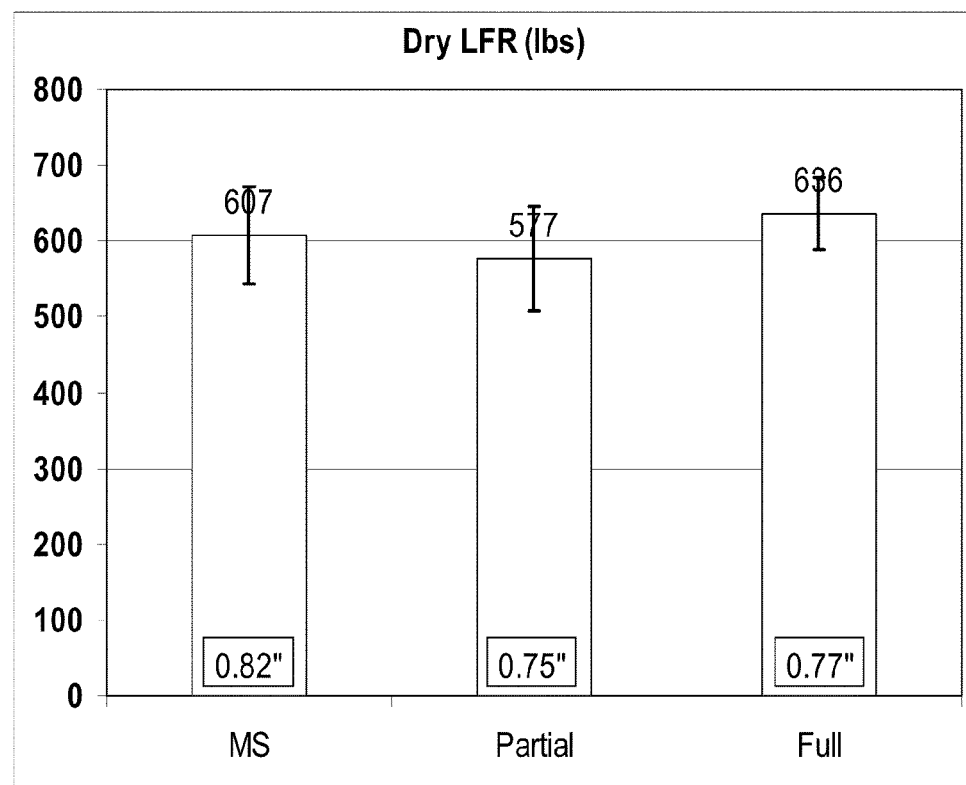
FIG. 15 is a bar graph of Dry Lateral Fastener Resistance for specimens from panels made using ceramic microspheres and partial and full replacement of the ceramic microspheres with the expanded perlite of the invention.
Figure 16:
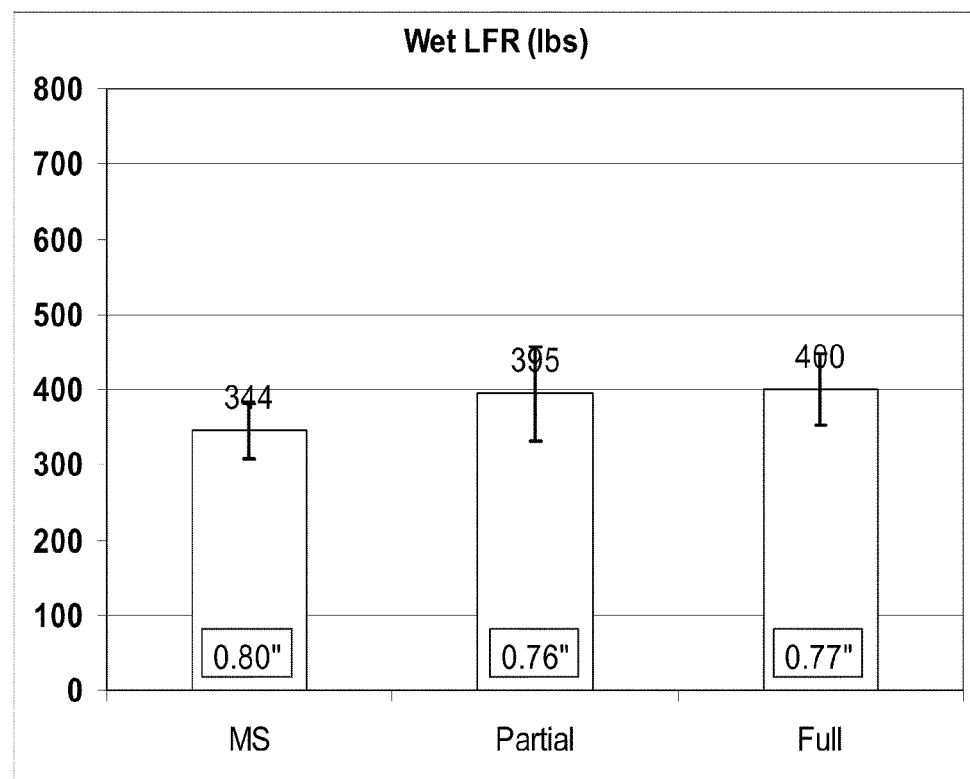
FIG. 16 is a bar graph of wet lateral fastener resistance for specimens from panels made using ceramic microspheres and partial and full replacement of the ceramic microspheres with the expanded perlite of the invention.

From panels made during the second round of production, 4"×12" (10.2 cm×30.5 cm) specimens were procured for testing of lateral fastener resistance, which measures the resistance of a panel edge to shearing due to lateral fastener pull. This property is a key property for shear diaphragm behavior of floor panels. The specific procedure adopted here for this evaluation consisted of drilling a ¼" (0.64 cm) hole in the specimen at a ½" (1.3 cm) distance from the 4" (10.2 cm) edge of the specimen. A steel plate with ¼" (0.64 cm) shank was then mounted to the specimen with the shank inserted into the hole in the specimen. The steel plate and specimen assembly was then pulled apart to force failure of the specimen over the ½" (1.3 cm) cover. The maximum load recorded during the fracture process was recorded as the lateral fastener resistance. This test was performed on specimens in both dry and wet (48-hr soak) conditions. Results from this test are shown in FIG. 15 for dry specimens and FIG. 16 for wet specimens. Each test set consisted of 10 replicate specimens. FIG. 15 shows Dry Lateral Fastener Resistance for specimens from panels made using ceramic microspheres, partial perlite and full perlite. FIG. 16 shows Wet Lateral Fastener Resistance for specimens from panels made using ceramic microspheres, partial perlite and full perlite.

The overall variation in test data is noted from FIGS. 15 and 16 and this was due to varying specimen thickness which directly affected the measured load. Average specimen thickness is also noted on the graphs. From the 95% confidence range however it is seen that the population sets were essentially similar. On average, the full perlite mix exhibited the highest lateral fastener resistance despite being somewhat thinner compared to the MS mixes. The minimum commercial specification requirements for this property are 210 lbs (dry) and 160 lbs (wet), in accordance with the minimum specification as established in ICC-ES Acceptance Criteria AC-318 and ASTM C 1705 standard.

The results for the perlite mixes are reproduced below in TABLE 7-1, below, together with corresponding data from prior art lightweight cement-based panels, which have been prepared from the composition set forth in TABLE 7-2. Due to the thickness difference between specimens, the LFR values were normalized to a 0.75" thickness as shown in the table. The perlite SCP formulations outperformed the lightweight cement-based panel formulation by four-fold in this property. One primary reason for this difference was the type and distribution of glass fibers in the products. In the case of SCP, the fibrillated and randomly dispersed fiber reinforcement rendered it more effective in arresting crack growth in all directions throughout the thickness of the panel, compared to the oriented surface reinforcement in the prior art lightweight cement-based panels. Differences in core structure between the two products also play a role in this difference with the SCP formulation being a denser product. The water to cementitious material ratio in the comparison lightweight cement-based prior art panel of TABLE 7-1 and 7-2 is 0.62.

TABLE 7-1

|  | Dry LFR (lbs) | Specimen thickness (in.) | Normalized LFR (lbs) |
|---|---|---|---|
| SCP Formulation—Partial Perlite | 577 | 0.75 | 577 |
| SCP Formulation—Full Perlite | 636 | 0.77 | 562 |
| Lightweight cement—based prior art panel (see TABLE 7-2) | 92 | 0.50 | 138 |

TABLE 7-2

| Ingredient | Weight % | Volume % |
|---|---|---|
| Portland Cement-based binder (cementitious reactive powder)[1] | 48.3 | 15.4 |
| Chemically coated perlite[2] | 4.8 | 18.4 |
| Expanded clay and shale aggregate | 16.9 | 10.7 |
| Total Liquids[3] | 30.0 | 28.4 |
| Entrained Air[4] | — | 27.2 |

[1]Portland cement 100 parts by weight, fly ash 30 parts by weight and land plaster 3 parts by weight.
[2]Sil-Cel 35-23 perlite: Silane coated with median particle size of about 40 microns.
[3]Total liquids of an aqueous solution of Aluminum Sulfate—0.10 wt. %; Triethanolamine—0.40 wt. %; Naphthalene sulfate based plasticizer—0.30 wt. % and Sodium Citrate—0.20 wt. %, wherein all weight per cents are based upon the weight of Portland cement-based binder.
[4]Entrained Air in the composite is provided by addition of sodium alpha olefin sulfonate surfactant at a dosage rate of 0.0069 wt. % based upon the total weight of the Example 8

Bearing Strength

As further described in Example 14, below, fiber reinforced panels were made using the MS, partial perlite and full perlite formulations for small scale fire testing. From these same panels, 6"×6" (15.2×15.2 cm) specimens were extracted for bearing strength evaluation. In this test, a 2"×2" square (5.1×5.1 cm) steel block with flat ends was positioned at the center of the 6"×6" (15.2×15.2 cm) specimen. Using a universal test frame, the steel block and specimen were pre-loaded to approximately 5 lbs. The steel block was then pressed into the specimen at a rate of 0.012 in./min (0.3 mm/minute.) while deflection was measured. The test was completed when specimen deflection was 0.10" in (25.4 cm) compression. Upon completion of the test, the specimen was removed and the thickness in the compressed and uncompressed was recorded to determine the "permanent set".

Figure 17:
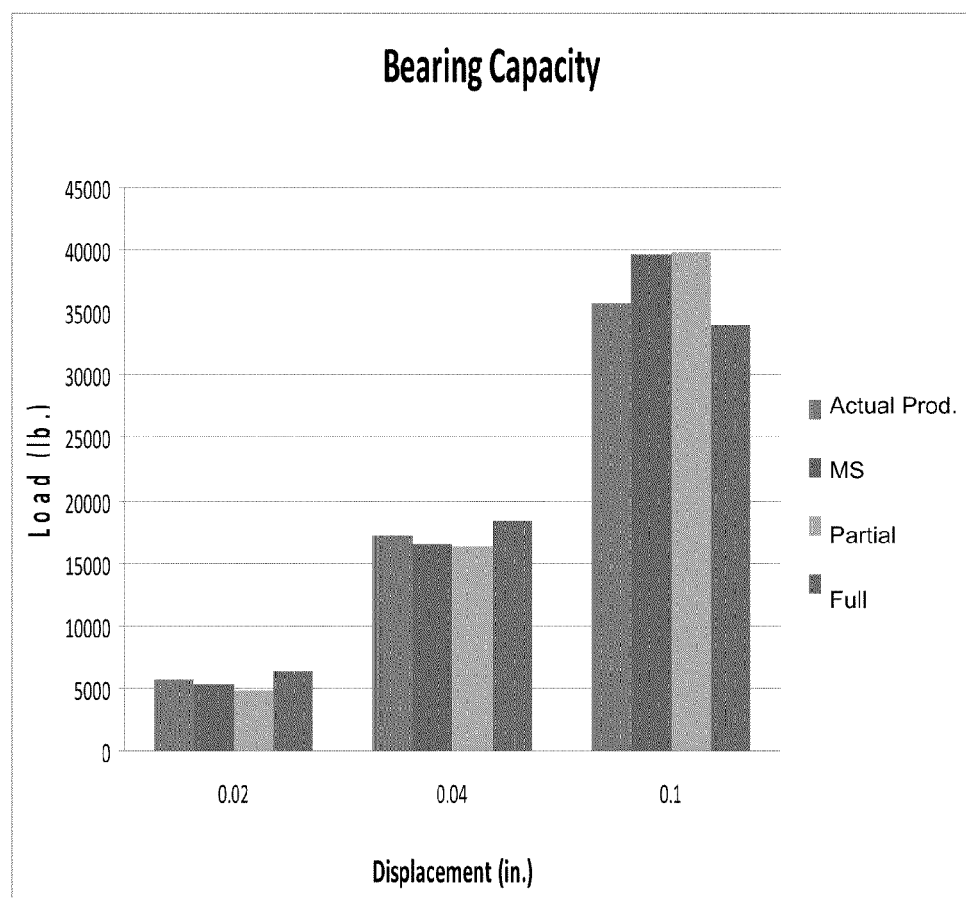
FIG. 17 is a bar graph of bearing capacity of specimens from panels made using ceramic microspheres and partial and full replacement of the ceramic microspheres with the expanded perlite of the invention.

The bearing capacity (in lbs.) for the various specimens tested is shown in FIG. 17 at varying deflection levels. FIG. 17 shows bearing capacity of specimens from panels made using ceramic microspheres, partial perlite and full perlite.

Figure 18:
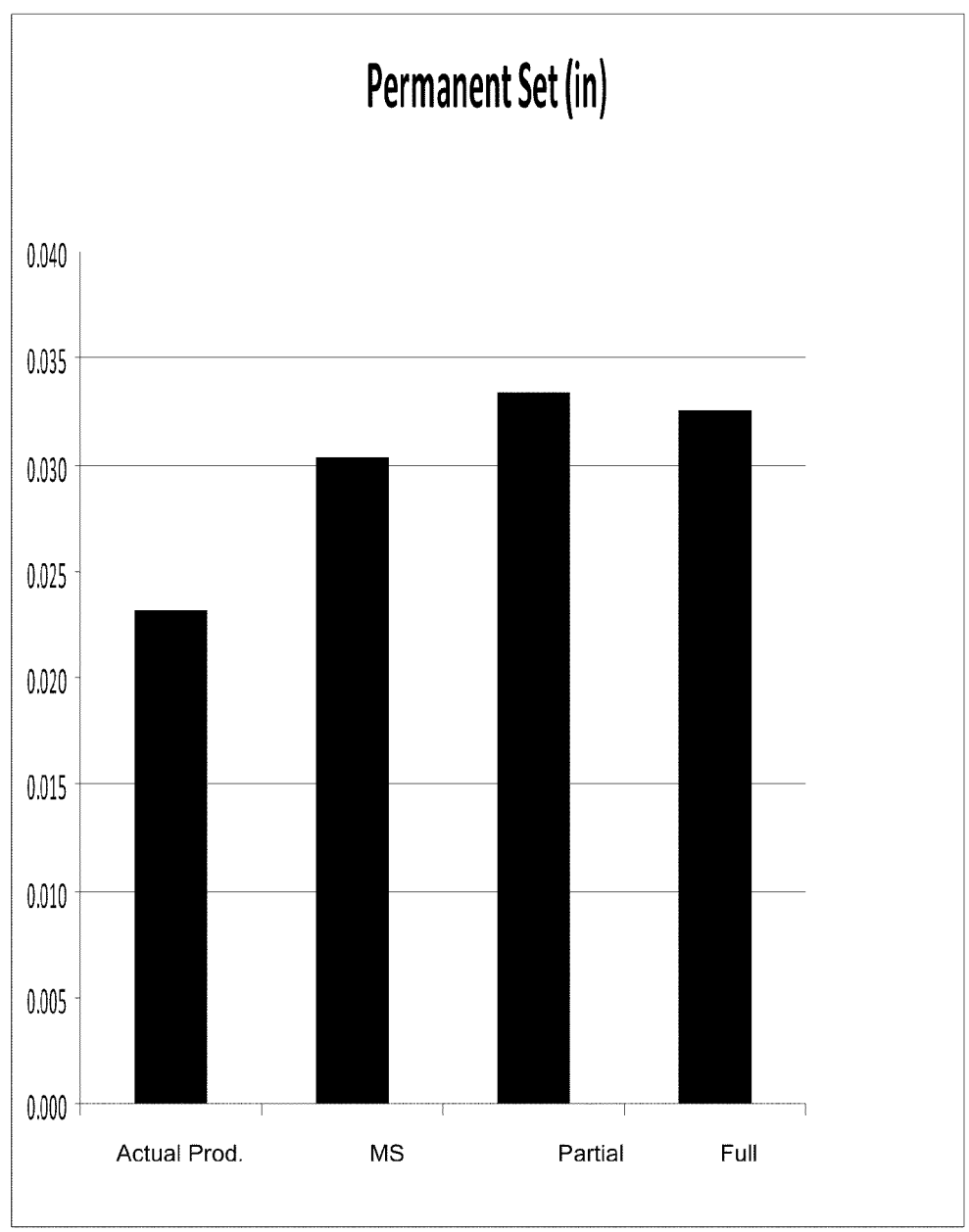
FIG. 18 is a bar graph for permanent set for panels made using ceramic microspheres and partial and full replacement of the ceramic microspheres with the expanded perlite of the invention.

Also shown in FIG. 17, results for an actual commercial production panel from the manufacturing plant (using MS) serve as a comparison. Each bar corresponds to the average of 5 specimens. In general, the perlite mixes performed similarly to the MS mix, especially in the case of partial perlite. For full perlite, there was more variation in the test result, as shown by the comparatively higher values at lower deflections and comparatively lower value at higher deflections. The permanent set measured from these specimens is shown in FIG. 18 where it is seen that all test panels (except for the production panel) showed permanent set in the same range. Thus, from these test results, it is apparent that perlite mixes (partial or full) offered similar levels of bearing capacity to the MS mix.

Example 9

Water Absorption

Figure 19:
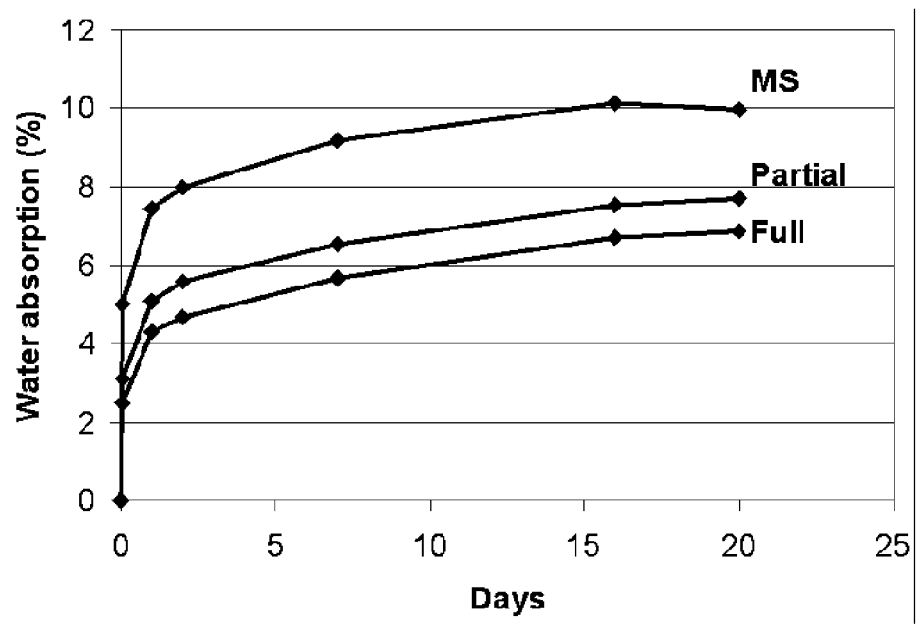
FIG. 19 is a bar graph for water absorption for specimens from panels made using ceramic microspheres and partial and full replacement of the ceramic microspheres with the expanded perlite of the invention.

Panels made during a second round of production were tested for the wetting behavior of the mixes. Water absorption was evaluated from 4"×4" (10.2×10.2 cm) specimens saw cut from the panels. These specimens (6 per set) were soaked in room temperature water and their weight monitored over a 21 day soaking period. The percent gain in weight from initial weight was recorded as the water absorption. For the three mixes evaluated, this property is shown in FIG. 19 which shows Water absorption for specimens from panels made using ceramic microspheres, partial perlite and full perlite. FIG. 19 shows the perlite mixes absorbed considerably less water than the microsphere mix (MS mix) over the duration of the test. The first-hour absorption, which is indicative of the tendency to draw water upon contact, was 5.0% (MS), 3.1% (Partial) and 2.5% (Full). The 48-hr absorption values were 8.0% (MS), 5.6% (Partial) and 4.7% (Full). Thus, in the first 2 days after contact with water, the full perlite absorbed 50-60% of the water absorbed by an MS mix. The typical specification value for 48-hr absorption is 15% maximum), in accordance with the minimum specification as established in ICC-ES Acceptance Criteria AC-318 and ASTM C 1705 standard.

Example 10

Linear Expansion

Panel specimens of 6"×12" (15.2×30.5 cm) were prepared from panels made during production runs for linear expansion testing using a modified ASTM C 1185 test procedure. Each specimen was mounted with brass studs, set in pairs 10" apart on each of the top and bottom specimen surfaces to serve as reference points for length change measurements. The average length change measured from the top and bottom specimen surfaces was recorded as the length change of that particular specimen. Specimens were first equilibrated in an oven at 130° F. (54° C.) until they reached steady length (following shrinkage), then submerged in water at room temperature until their length steadied out again (following expansion). Linear expansion was then computed as the length difference between the shrunk and expanded states, expressed as a percent of the initial specimen gage length (10")(25.4 cm). In this example, each test set consisted of 5-6 replicate specimens.

Figure 20:
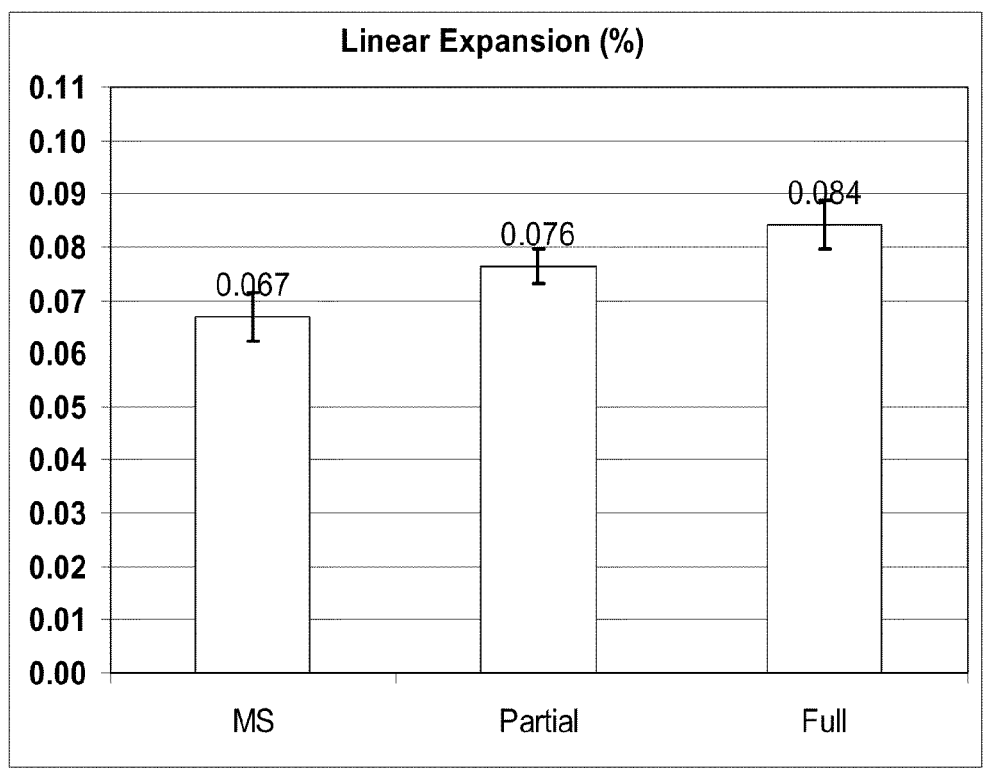
FIG. 20 is a bar graph for linear expansion for specimens of panels made using ceramic microspheres and partial and full replacement of the ceramic microspheres with the expanded perlite of the invention.

The linear expansion for the mixes evaluated is shown in FIG. 20. In particular, FIG. 20 shows linear expansion for specimens from panels made using ceramic microspheres, partial perlite and full perlite. FIG. 20 shows in general the perlite specimens tended to expand somewhat more compared to the MS specimens. Typical specifications require linear expansion of specimens to be 0.10% maximum, per the specification as established in ICC-ES Acceptance Criteria AC-318 and ASTM C 1705 standard. And this test, linear expansion is measured as the percent difference in length of a specimen in going from equilibrium conditions at 73±4° F. and 30±2% relative humidity to equilibrium conditions at 73±6° F. and 90±5% relative humidity.

Since the conditions in which the specimens were subjected to in this study were considerably more severe than those described in ASTM C 1185, the mixes investigated in this study would be expected to exhibit expansion values lower than those shown in FIG. 20 had they been tested to ASTM C 1185 conditions.

Example 11

Non-Combustibility

In this example, the non-combustibility performance of the proposed formulations is demonstrated. Slurry specimens from MS, partial perlite and full perlite formulations described above in paragraphs under the heading Example, were prepared for testing to ASTM E 136. These specimens were mounted with thermocouples (internally and externally), placed in a furnace at 750° C. and allowed to gain heat. The maximum rise in internal and surface temperature was recorded as well as the weight change and duration of flaming on the specimens. Results from these tests are summarized in TABLE 11-1. For the partial perlite mix, two variants were tested: one with the regular amount of superplasticizer used in all other evaluations of this mix and another with a higher amount of superplasticizer. The ASTM E 136 requirements for non-combustibility are that: a) neither one of the recorded temperatures shall rise more than 30° C. above the stabilized temperature of 750° C., b) weight loss shall be 50% or less, and c) there shall be no flaming from the specimen after the first 30 seconds. All formulations tested passed the non-combustibility requirements. The temperature rise however was lower for perlite mixes compared to mixes containing only microspheres (MS). For instance, the average rise in interior temperature for the 3 specimens in each set was: 19.7° F. (−6.83° C.)(MS), 17.3° F. (−9.17° C.)(partial perlite, low superplasticizer), and 15.0° F. (−9.44° C.)(full perlite). The improved non-combustibility performance of the perlite mixes over MS mixes may be related to the absence of organic material normally present in trace quantities in MS (recorded as LOI). As such, the perlite formulations, in particular the full perlite, offer an added advantage with respect to this non-combustibility property.

The formulations of the invention met the performance requirements in accordance with the performance requirements of ICC-ES Acceptance Criteria AC-318 and the ASTM C 1705 Standard.

Since the conditions in which the specimens were subjected to in this study were considerably more severe than those described in ASTM C 1185, the mixes investigated in this study would be expected to exhibit expansion values lower than those shown in FIG. 20 had they been tested to ASTM C 1185 conditions.

TABLE 11-1

ASTM E 136 non-combustibility performance of specimens made using all ceramic microspheres (MS), partial (half perlite and half microspheres by weight) and full (all) perlite.

| Sample | Weight Loss % | Initial Furnace | Specimen Interior Maximum | Rise | Specimen Surface Max. | Rise | Flaming (seconds) | Pass/Fail |
|---|---|---|---|---|---|---|---|---|
| Control Mix, All Microsphere, BASF Melflux PCE 267L at 0.41% by wt. cements (10.4 lbs/MSF) | | | | | | | | |
| Control | 24.0 | 751 | 771 | 20 | 759 | 8 | 0 | P |
| Control | 23.4 | 750 | 770 | 20 | 760 | 10 | 0 | P |
| Control | 23.5 | 751 | 770 | 19 | 763 | 12 | 0 | P |
| Partial Perlite Mix, BASF Melflux PCE 267L at 0.465% by wt. cements (14.0 lbs/MSF) | | | | | | | | |
| 1 | 25.5 | 751 | 773 | 22 | 762 | 11 | 0 | P |
| 2 | 24.3 | 751 | 767 | 16 | 756 | 5 | 0 | P |
| 3 | 24.8 | 751 | 765 | 14 | 755 | 4 | 0 | P |
| Partial Perlite Mix, BASF Melflux PCE 267L at 0.56% by wt. cements (17.2 lbs/MSF) | | | | | | | | |
| 1 | 24.5 | 750 | 775 | 25 | 762 | 12 | 0 | P |
| 2 | 24.3 | 750 | 770 | 20 | 761 | 11 | 0 | P |
| 3 | 24.0 | 750 | 777 | 27 | 759 | 9 | 0 | P |
| Full Perlite Mix, BASF Melflux PCE 267L at 0.53% by wt. cements (18.0 lbs/MSF) | | | | | | | | |
| 1 | 26.7 | 751 | 763 | 12 | 757 | 6 | 0 | P |
| 2 | 26.6 | 750 | 767 | 17 | 758 | 8 | 0 | P |
| 3 | 26.7 | 749 | 765 | 16 | 756 | 7 | 0 | P |

Example 12

High Temperature Shrinkage

From panels made during the first production round, specimens were also procured for high temperature shrinkage testing. In this test, 4" (10.2 cm) diameter specimens saw-cut from the panels were placed in a muffle furnace at initial room temperature. The oven was then allowed to heat up to 850° C. which normally required about 35-40 minutes. And was then maintained at this temperature for about another 30 minutes, for a total test time of 60-70 minutes. The specimen diameter along two perpendicular directions was measured prior and following the test and the percent change in average diameter was reported as the "high temperature shrinkage". As reference, a maximum shrinkage of 5% is specified for FIRECODE® brand Type X gypsum panels. Tests were conducted in pairs with each pair comprising an MS mix specimen together with a perlite (partial or full) mix specimen. Tests were also conducted in two separate ovens, labeled PSL and CSL, for reproducibility analysis. The shrinkage results and weight loss are shown in TABLE 12-1. It is generally seen that the perlite mixes exhibited greater shrinkage and weight loss compared to the MS mixes, with shrinkage and weight loss increasing as perlite content increased. The overall shrinkage values for the perlite mixes were well within acceptable commercial ranges for gypsum panels and also as important, the specimens remained sound and solid at completion of testing.

TABLE 12-1

| Oven | Mix Type | Avg. Shrinkage % | Avg. Weight Loss % |
|---|---|---|---|
| PSL OVEN | MS | 0.74 | 18.1 |
| | Partial Perlite | 1.15 | 22.3 |
| CSL OVEN | MS | 0.86 | 18.2 |
| | Partial Perlite | 1.05 | 21.7 |
| PSL OVEN | MS | 0.98 | 18.8 |
| | Full Perlite | 1.92 | 23.9 |
| CSL OVEN | MS | 0.84 | 17.8 |
| | Full Perlite | 2.05 | 23.3 |

TABLE 12-1—High temperature shrinkage performance of specimens of SCP panels made using ceramic microspheres, partial perlite and full perlite TABLE 12-2—High temperature shrinkage performance of specimens made using partial and full coated perlite with structural cement panels (SCP) panels from TABLE 12-1 with a comparison lightweight cement based prior art panel of TABLE 7-2.

| Mix Type | Oven | No. of Specimens | Avg. Shrinkage % |
|---|---|---|---|
| SCP—Partial Perlite | PSL OVEN | 3 | 1.15 |
| SCP—Partial Perlite | CSL OVEN | 3 | 1.05 |
| SCP—Full Perlite | PSL OVEN | 3 | 1.92 |
| SCP—Full Perlite | CSL OVEN | 3 | 2.05 |
| Lightweight cement—based prior art panel with coated Perlite | PSL OVEN | 6 | 2.58 |

Example 13

Thermal Transmission

Figure 21:
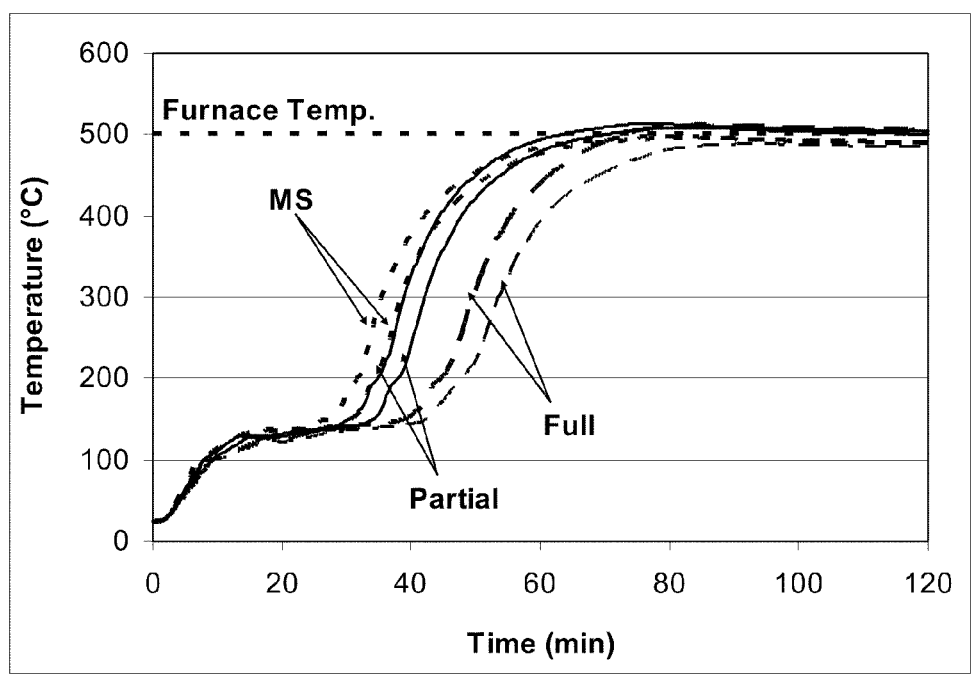
FIG. 21 is a bar graph for temperature-time curves for specimens of panels made using ceramic microspheres and partial and full replacement of the ceramic microspheres with the expanded perlite of the invention exposed to 500° C.

From panels made during the second production round, specimens were also procured for thermal transmission testing. In this test, a thermocouple was "sandwiched" between two 4" (10.2 cm) discs of the product in question. This assembly was then placed in a muffle furnace preheated to 500° C. for 120 minutes. The temperature-time record measured by the thermocouple was then evaluated for product behavior and performance. The temperature-time curves from these tests are shown in FIG. 21 where two replicate curves are shown for each mix. It is seen that all mixes portrayed the same pattern whereby the temperature rise slowed down once the temperature reached about 125° C. Following this plateau, the temperature rose again until finally equilibrating with the background furnace temperature. The panel samples made with perlite mixes extended the duration of the plateau, thus effectively delaying temperature rise in the sample. The extent of this delay was enhanced with increasing amounts of the coated expanded perlite in the formulation. To characterize this delay, the time required to reach 250° C. was compared. For the various mixes, the time required to reach 250° C. was 35 min. for mixes containing (MS), 39 min. (partial perlite) and 50 min. (full perlite). The perlite formulations, particularly the full perlite formulations, were significantly more effective in delaying heat transmission through the specimen, which would be very significant for floor and wall assemblies exposed to high temperatures.

Example 14

Small Scale Horizontal Furnace Testing

Fiber reinforced panels based on microspheres (MS) with no perlite, one half perlite and one half perlite (Partial) and perlite formulations with no microspheres (Full) were made for small scale horizontal furnace testing. In this test, small scale (4'×5')(1.2×1.5 m) floor assemblies were constructed using 16 gauge, 9¼" (23.5 cm) deep steel studs as frame members. The top of the studs was covered with one layer of the panel in question, while the bottom of the studs was covered with one layer of ⅝" (1.6 cm) gypsum panel. The panels were fastened to the studs using 1⅝"×8 (4.1×20.3 cm) Bugle head self-drilling winged screws at 8" (20.3 cm) spacing. Three thermocouples were mounted on the top surface of the test panels to record the thermal transmission through the panel. The entire floor assembly was then placed on a furnace that subjected the assembly to ASTM E 119 temperature-time conditions from its underside, and the temperature rise was measured from the thermocouples.

Figure 22:
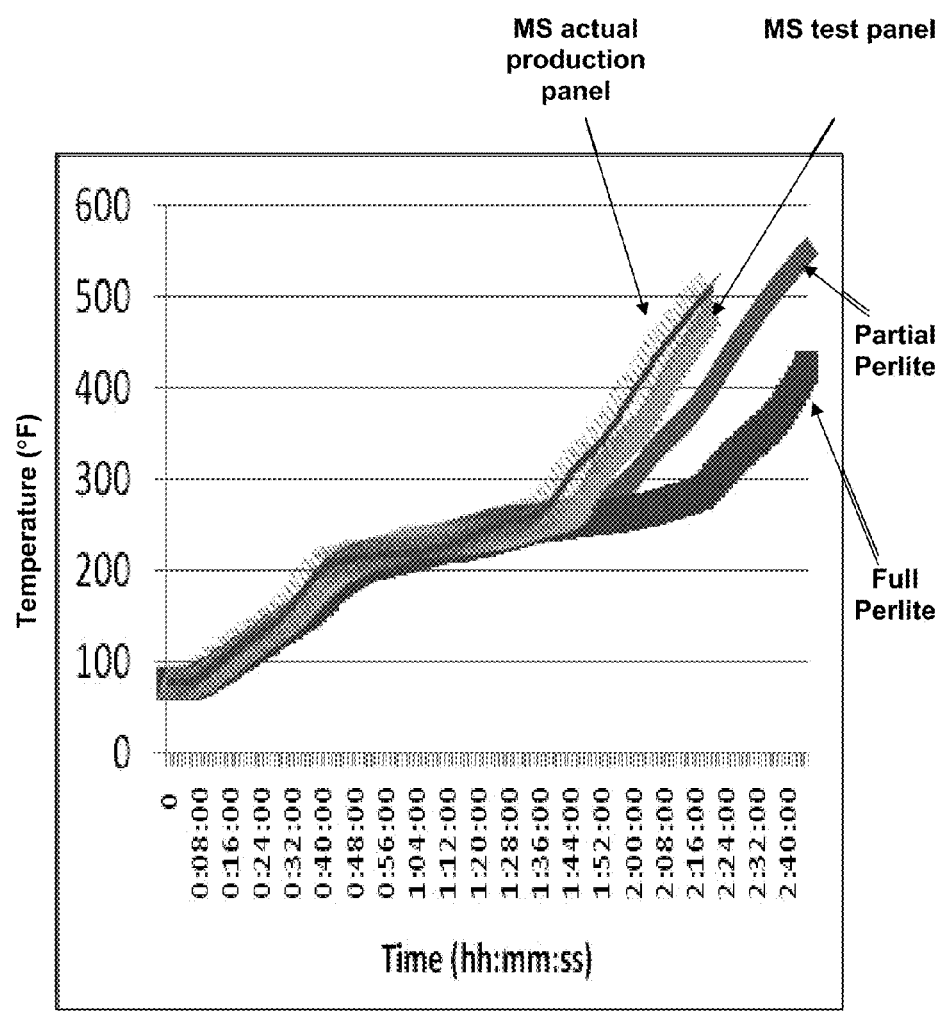
FIG. 22 is a bar graph for temperature-time curves for panels made using ceramic microspheres and partial and full replacement of the ceramic microspheres with the expanded perlite of the invention tested on small scale horizontal furnace.

Results from these tests are presented in FIG. 22 which shows the average temperature-time trace for thermocouples on the panel surfaces. In particular, FIG. 22 which shows Temperature-time curves for MS, Partial Perlite and Full Perlite panels tested on small scale horizontal furnace. A curve is also shown for a test performed on an actual commercial production panel (using only MS) to serve as comparison. In general, it is seen that the perlite panels were more effective in delaying thermal transmission through the panels, and the delay was more pronounced with increasing perlite amount. This delay was manifested by a longer plateau at the temperature range of 200-250° F. (93.3-121° C.). To characterize the temperature-time response from the thermocouples, two time parameters were defined:

the time required for the average of all thermocouples to reach 325° F. (163° C.); and the time required for the first individual thermocouple to reach 400° F. (204° C.). These times are summarized in TABLE 14-1 showing the perlite mixes were capable of extending the time required to reach these specified temperatures. In particular, the full perlite mixes which replaced all ceramic microspheres in the panel, extended this time by an additional 25-30% over the mixes which contained ceramic microspheres. This behavior reflected the behavior observed in Thermal Transmission testing (Example 13) in which mixes which fully replaced ceramic microspheres with the coated expanded perlite had greater capacity for delaying temperature rise in the material. This example again proves the added benefits of the perlite formulation for high temperature condition in an actual floor assembly.

TABLE 14-1

Time required to reach pre-defined temperature limits.

| | Time to Reach: | |
|---|---|---|
| Panel | Avg. Temp of 325° F. | Individual Temp of 400° F. |
| MS | 114 min | 126 min |
| Partial perlite | 124 min | 138 min |
| Full perlite | 146 min | 160 min |

Example 15

Comparison of Slurry Compositions Made with Coated and Uncoated Perlite

Among the various properties of the slurry in the fresh state, one critical property for the manufacture of SCP panels is the slump. Slump is a measure of the slurry fluidity which must be maintained within a certain range, preferably 5-9", when measured using the technique described in Example 1. Slurry with slump in this range is optimum for ease of pumping and placing on the production line, proper spreadability over the forming belt, proper wetting of glass fibers and adequate screeding for thickness and profile control. An experiment was conducted to characterize the differences in behavior between slurries made with silane coated perlites and uncoated perlites. In this example, two mixes were prepared with identical proportions and the only difference being the type of perlite. The perlite to binder weight ratio was 0.115 to 1.00, while the weight ratio of water to binder was 0.45: 1.00. A polycarboxylate ether superplasticizer was also used at a dosage of 0.41% by weight of cement binder. Both mixes were made at a tartaric acid to cement binder weight ratio of 0.061 and both mixes reached a final set at about 45-50 minutes.

Figure 23:
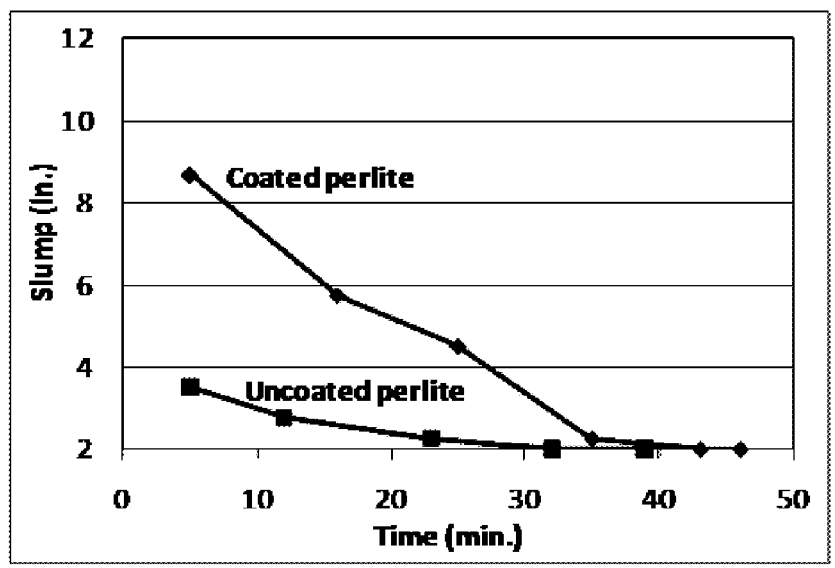
FIG. 23 is a graph of the slump in inches versus time for cementitious compositions of the invention containing coated perlite compared to identical compositions containing uncoated perlite.
Figure 24:
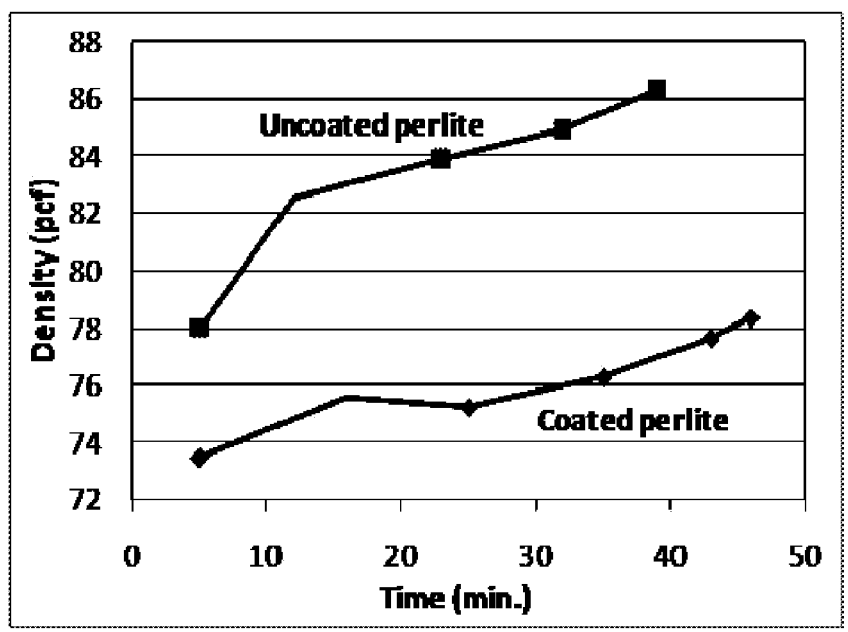
FIG. 24 is a graph of density versus time for cementitious compositions of the invention containing coated perlite compared to identical compositions containing uncoated perlite.

FIG. 23 shows the slump and FIG. 24 shows the density of slurries made with coated and uncoated perlites. The difference in fluidity is clearly manifested in the initial slump, in which the mix with coated perlite demonstrated fluidity in the upper level of the preferred range, while the mix with uncoated perlite showed very little fluidity. Over time, the slurry with uncoated perlite gradually turned to a thick, non-fluid mix, while the slurry with coated perlite maintained its fluidity at a reasonable level. Also over time, the slurry with uncoated perlite underwent a greater density increase which was due to the absorption of water in the perlites. This example demonstrated the advantages of having a water repellent coating on the perlite, in order to enhance the properties of the SCP slurry for better overall manufacturability.

Example 16

Water Demand of Mixes Made with Perlite and Ceramic Microspheres

Figure 25:
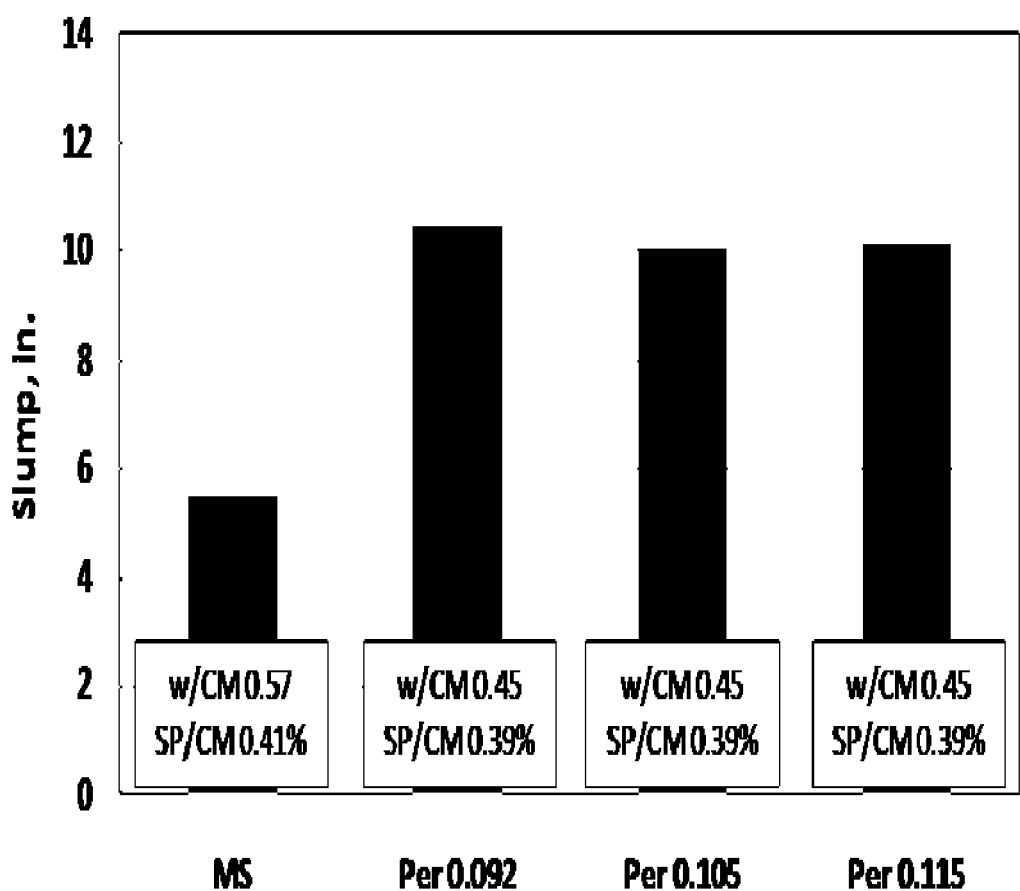
FIG. 25 is a bar graph of slump in inches versus time for compositions of the invention containing ceramic microspheres compared to the coated perlite of the invention made with similar superplasticizer dosages.

SCP formulations made using ceramic microsphere or coated perlite as filler are fundamentally different from one another. The differences in particle density between the two fillers result in different volumetric demands of other raw materials in order to maintain the same product density and slurry properties. This is further influenced by the water repellent coating in the perlite which affects interaction between particles and overall rheological behavior. One unexpected but important finding from this invention is the water demand of the perlite mixes. Example 1 described SCP formulations containing ceramic microsphere fillers which were prepared with microsphere to binder ratio of 0.44:1.00 by weight, water to cement binder ratio of 0.57:1.00 and superplasticizer dosage of 0.41% by weight of cement binder (MS mixes). Separate formulations containing perlite fillers were prepared with perlite to binder ratios of 0.092, 0.105 and 0.115 by weight, water to cement binder ratio of 0.45:1.00 and superplasticizer dosage of 0.39% by weight of cement binder. The focus of this discussion is on the fluidity of these mixes which is shown by their slump in FIG. 25. At approximately the same superplasticizer dosage relative to cement binder, substantially more fluid mixes were attainable with the perlite formulation, for all shown perlite contents, compared to the microsphere formulation. The water repellent coating on the perlite particles appears to help with particle dispersion in the slurry which helps attain a higher fluidity, at a lower water to cement binder ratio. This result was elucidated in the previous example which contrasted the flow characteristics between mixes made with coated and uncoated perlites. Relative to ceramic microspheres, this means that formulations with perlite are capable of being made using considerably lower water to binder ratios, which in turn is advantageous for strength and long term durability of the cement matrix.

Those skilled in the art of cementitious boards, including fiber reinforced structural cement panels, gypsum wallboard, and gypsum-cement fiberboard will recognize that many substitutions and modifications can be made in the foregoing embodiments without departing from the spirit and scope of the present invention

What is claimed is:

1. A non-combustible, fire resistant lightweight reinforced cementitious panel for resisting transverse and shear diaphragm loads having improved water durability and greater resistance to thermal transmission comprising:
    a continuous phase resulting from the curing of an aqueous mixture of:
    a cementitious composition comprising, on a dry basis,
    50 to 95 wt % reactive powder,
    1 to 20 wt % of coated hydrophobic expanded perlite particles uniformly distributed as lightweight filler in said continuous phase, the coated hydrophobic perlite particles having a diameter in the range of about 1 to 500 microns (micrometers), a median diameter of 20 to 150 microns (micrometers) and an effective particle density (specific gravity) of less than about 0.50 g/cc,
    0 to 25 wt % hollow ceramic microspheres, and
    3 to 16 wt. % alkali-resistant glass fibers for uniformly reinforcing the continuous phase;
    wherein said reactive powder comprises:
    25 to 75 wt. % calcium sulfate alpha hemihydrate,
    10 to 75 wt. % hydraulic cement comprising Portland cement,
    0 to 3.5 wt. % lime, and
    5 to 30 wt. % of an active pozzolan; and
    the panel having a density of 50 to 100 pounds per cubic foot.

2. The panel of claim 1, the coated hydrophobic expanded perlite particles having a diameter in the range of about 1 to 500 microns (micrometers), a median diameter of 20 to 90 microns (micrometers) and an effective particle density (specific gravity) of less than about 0.30 g/cc.

3. The panel of claim 1, wherein the cementitious panel does not contain intentionally entrained air.

4. The panel of claim 1, wherein the reactive powder comprise 55 to 75 wt % calcium sulfate hemihydrate, 20 to 35 wt % Portland cement, 0.75 to 1.25 wt. % lime, 7.5 to 20 wt % of an active pozzolan and an optional superplasticizer.

5. The panel of claim 1, wherein the panel contains 2 to 6 weight % coated expanded perlite particles and 10 to 20 weight % hollow ceramic microspheres.

6. The panel of claim 1, wherein the coated hydrophobic expanded perlite particles are coated with a coating selected from the group consisting of silicones, silanes and siloxanes.

7. The panel of claim 1, wherein the lightweight filler in the cementitious composition consists of 7 to 15 wt. % of coated hydrophobic expanded perlite particles.

8. The panel of claim 1, wherein the water and reactive powder in the aqueous mixture before curing is in a weight ratio of from about 0.35 to 0.65.

9. The panel of claim 1, wherein a 0.75 inch thick panel when tested according to ASTM E 661 test method over a span of 16, 20 and 24 inches on center, has an ultimate load capacity greater than 550 lbs. under static loading, an ultimate load capacity greater than 400 lbs. after impact loading and a maximum deflection before and after impact with a 200-lb load is less than 0.078 inches, 0.094 inches and 0.108 inches over spans of 16, 20 and 24 inches, respectively.

10. The panel of claim 1, wherein said panel has been formed from 70 to 93 wt. % of said reactive powders, 4 to 10 wt. % of said glass fibers, and 4 to 20 wt. % of said lightweight filler comprising coated hydrophobic expanded perlite particles, each on a dry basis and optional superplasticizer.

11. The panel of claim 10, wherein said panel has been formed from 80 to 90 wt. % of said reactive powders, 5 to 8 wt. % of said glass fibers, and 7 to 15 wt. % of said lightweight filler comprising coated hydrophobic expanded perlite particles, each on a dry basis.

12. The panel of claim 1, wherein said active pozzolan is at least one member of the group consisting of silica fume, metakaolin, ground granulated blast furnace slag, and pulverized fly ash.

13. The panel of claim 1, wherein said panel has a shear rating of at least 720 lbs/ft (1072 kg/m) when a 0.5 inch (12.7 mm) thick panel tested according to ASTM E72 test method using metal frame fasteners with a fastener spacer of 6 inches (152 mm) on center at the perimeter and 12 inches on center on the intermediate studs.

14. The panel of claim 1, wherein the panel has one or more outer layers wherein the outer layer(s) have been formed from 70 to 93 wt. % of said reactive powders, 4 to 10 wt. % of said glass fibers, and 4 to 20 wt. % of coated hydrophobic expanded perlite particles, each on a dry basis.

15. The panel of claim 14, wherein said outer layers have been formed from 80 to 90 wt. % of said reactive powders, 5 to 8 wt. % of said glass fibers, and 7 to 15 wt. % of said coated hydrophobic expanded perlite particles, each on a dry basis.

16. The panel of claim 1, wherein at spans of 16, 20 or 24 inches, the panel has a moment capacity as determined by the method of ASTM C 1704, of at least 1,450 lbf-in/ft width in both machine and cross-machine directions determined under dry conditions, and at least 1,015 lbf-in/ft width in both machine and cross-machine directions determined under wet conditions after being soaked in water for 48 hours.

17. The panel of claim 16, wherein the panel has a thickness of about 0.72 to about 0.78 inches.

18. The panel of claim 1, wherein at spans of 16, 20 or 24 inches on center, the panels has a moment capacity, as determined by the method of ASTM C 1704, of at least 1,007 lbf-in/ft width in both machine and cross-machine directions as determined under dry conditions and at least 705 lbf-in/ft width in both machine and cross-machine directions as determined under wet conditions.

19. A method for providing improved fire resistance for a shear diaphragm in a building by improving resistance to thermal transmission of a structural cement panel in a building structure comprising applying the panel of claim 1 to a metal framing element for use as a shear diaphragm in shear bearing wall systems, flooring systems and/or roofing system in said building.

20. A method for providing improved fire resistance for a shear diaphragm in a building by improving resistance to thermal transmission of a structural cement panel in a building structure comprising applying a first non-combustible, fire resistant lightweight reinforced cementitious panel for resisting transverse and shear diaphragm loads having improved water durability and greater resistance to thermal transmission, to a metal framing element for use as a shear diaphragm in shear bearing wall systems, flooring systems and/or roofing system in said building, the first panel comprising:
a continuous phase resulting from the curing of an aqueous mixture of:
a cementitious composition comprising, on a dry basis,
50 to 95 wt % reactive powder,
1 to 20 wt % of coated hydrophobic expanded perlite particles uniformly distributed as lightweight filler in said continuous phase, the coated hydrophobic perlite particles having a diameter in the range of about 1 to 500 microns (micrometers), a median diameter of 20 to 150 microns (micrometers) and an effective particle density (specific gravity) of less than about 0.50 g/cc,
0 to 25 wt % hollow ceramic microspheres, and
3 to 16 wt. % alkali-resistant glass fibers for uniformly reinforcing the continuous phase;
wherein said reactive powder comprises:
25 to 75 wt. % calcium sulfate alpha hemihydrate,
10 to 75 wt. % hydraulic cement comprising Portland cement,
0 to 3.5 wt. % lime, and
5 to 30 wt. % of an active pozzolan; and
the first panel having a density of 50 to 100 pounds per cubic foot;
wherein a time for thermal transmission in the first panel is delayed by about 10% % to 40% compared to a time for thermal transmission in a second panel having the same composition as the first panel except for comprising ceramic microspheres instead of coated hydrophobic expanded perlite particles.

* * * * *